United States Patent [19]
Hindman

[11] Patent Number: 5,546,084
[45] Date of Patent: Aug. 13, 1996

[54] SYNTHETIC APERTURE RADAR CLUTTER REDUCTION SYSTEM

[75] Inventor: Carlton L. Hindman, Rancho Palos Verdes, Calif.

[73] Assignee: TRW Inc., Redondo Beach, Calif.

[21] Appl. No.: 917,632

[22] Filed: Jul. 17, 1992

[51] Int. Cl.$^6$ .................................................. G01S 13/90
[52] U.S. Cl. ............................ 342/25; 342/161; 342/162
[58] Field of Search ............................... 342/25, 90, 161, 342/162

[56] References Cited

U.S. PATENT DOCUMENTS

| | | | |
|---|---|---|---|
| H910 | 4/1991 | Hindenach | 342/25 |
| 4,191,957 | 3/1980 | Walker et al. | 342/190 |
| 4,355,311 | 10/1982 | Jain | 342/25 |
| 4,628,318 | 12/1986 | Alitz | 342/26 |
| 4,684,950 | 8/1987 | Long | 342/94 |
| 4,742,353 | 5/1988 | D'Addio et al. | 342/159 |
| 4,748,448 | 5/1988 | Thompson | 342/26 |
| 4,766,435 | 8/1988 | Wells | 342/82 |
| 4,771,287 | 9/1988 | Mims | 342/25 |
| 4,829,303 | 5/1989 | Zebker et al. | 342/25 |
| 4,829,306 | 5/1989 | Gjessing et al. | 342/159 |
| 4,845,500 | 7/1989 | Cornett et al. | 342/90 |
| 4,866,446 | 9/1989 | Hellsten | 342/25 |
| 4,907,001 | 3/1990 | Harmuth | 342/159 |
| 4,922,254 | 5/1990 | Schuessler et al. | 342/25 |
| 4,928,131 | 5/1990 | Onozawa | 342/188 |
| 4,933,678 | 6/1990 | Tennyson | 342/176 |
| 4,963,877 | 10/1990 | Wood et al. | 342/25 |
| 4,972,193 | 11/1990 | Rice | 342/90 |
| 4,978,961 | 12/1990 | Williams et al. | 342/25 |
| 4,985,704 | 1/1991 | Smith | 342/25 |
| 4,989,008 | 1/1991 | Fujisaka et al. | 342/25 |
| 4,992,797 | 2/1991 | Gjessing et al. | 342/192 |
| 5,047,776 | 9/1991 | Baller | 342/52 |
| 5,051,749 | 9/1991 | Stoyle | 342/25 |
| 5,053,778 | 10/1991 | Imhoff | 342/191 |
| 5,055,850 | 10/1991 | Lamper et al. | 342/201 |
| 5,057,843 | 10/1991 | Dubois et al. | 342/25 |
| 5,059,966 | 10/1991 | Fujisaka et al. | 342/25 |
| 5,061,931 | 10/1991 | Farina et al. | 342/25 |
| 5,119,100 | 6/1992 | Marini et al. | 342/195 |
| 5,142,291 | 8/1992 | Chang et al. | 342/424 |
| 5,184,134 | 2/1993 | Niho et al. | 342/25 |
| 5,200,754 | 4/1993 | Niho | 342/25 |
| 5,227,801 | 7/1993 | Pierce | 342/192 |
| 5,243,349 | 9/1993 | Mims | 342/25 |
| 5,276,632 | 1/1994 | Corwin et al. | 364/578 |

Primary Examiner—John B. Sotomayor

[57] ABSTRACT

A method, and corresponding apparatus, for deriving clutter-reduced images of the ocean surface in synthetic aperture radar (SAR) systems. An estimate of ocean surface parameters is first made and subsequently updated iteratively, to provide a reliable model of a selected patch of the ocean as it existed when a series of conventional spotlight mode SAR images were obtained. Based on the estimated ocean model, and on models of ocean wave behavior, of radar scattering behavior, and of the SAR acquisition system, predicted SAR images can be generated, and compared with the measured SAR images, and clutter-reduced images can be produced as a result. In addition to the clutter-reduced images, the method and apparatus of the invention produce an accurate estimate of ocean surface data, and can be used in a reliable approach for detecting hard targets on the ocean.

16 Claims, 17 Drawing Sheets

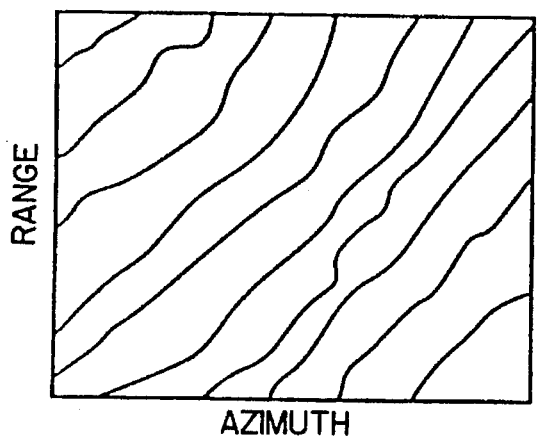 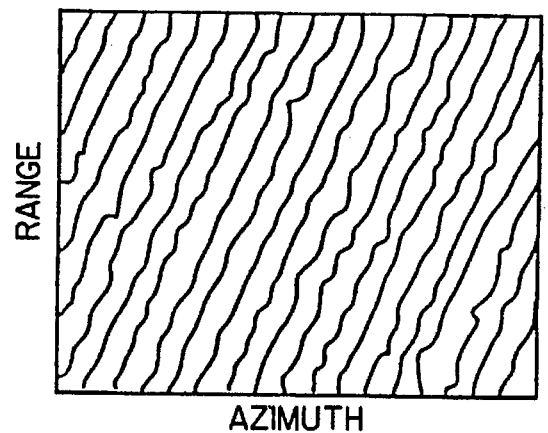
FIG.4A PRIOR ART — TRUE OCEAN WAVE FIELD
FIG.4B PRIOR ART — SAR IMAGE SHOWING EFFECTS OF VELOCITY BUNCHING Surface Ship Wake Cross-Section Model

SYNTHETIC APERTURE RADAR CLUTTER REDUCTION SYSTEM

BACKGROUND OF THE INVENTION

This invention relates generally to, synthetic aperture radar systems and, more particularly, to synthetic aperture radar systems used to monitor various phenomena related to the oceans, such as wind speed measurement, ocean wave characteristics, ocean currents, ice flow movement, ship traffic, and so forth. Today, virtually all geological, topographic and mineralogical maps rely on aircraft or satellite photography or radar. Radar has the advantage that it is relatively unimpaired by clouds, rain or fog, but has the disadvantage that, because of longer wavelengths than those of visible light, it needs a very large antenna to achieve the same resolution and image clarity as an optical camera.

More specifically, a conventional radar system obtains range resolution, i.e. distinguishes between target scenery elements at different distances from a radar transmitter/receiver, by transmitting a short radar pulse and measuring the times of arrival of pulses reflected from various elements of the target scenery. In "real aperture" radar systems, the image resolution obtained depends principally on the antenna beam width. Fine azimuth resolution requires a very large antenna, often too large for aircraft or satellite use. Synthetic aperture radar (SAR) systems solve this problem by making use of a variable Doppler shift associated with points in the target scenery. Because of the relative motion between scenery and the aircraft or spacecraft carrying the radar system, images of points in the scenery in front of the antenna are subject to a positive Doppler shift, and points in the scenery to the rear of the antenna are subject to a negative Doppler shift. A SAR system uses a process called azimuth compression or phase history processing, to produce fine resolution images with a relatively small antenna.

SAR systems have been used for some time to monitor the oceans. Radar imagery of the ocean can contain signals due to "hard" targets, such as ships, and more complex signals due to electromagnetic scattering from the water surface itself. When the hard target signals are of primary interest, signal scattering from the water surface is undesirable noise, or "clutter." This clutter can sometimes obscure the hard target signals, and it has long been a goal of designers of radar systems to devise a reliable technique for attenuating or suppressing the clutter due to scattering from the ocean surface.

Another class of applications of ocean radar involves the analysis of movements of the ocean itself, such as in the measurement of ocean currents, wind speed and direction, and so forth. These applications use the signals due to scattering from the ocean surface. In most applications, the information of interest includes the size, strength, and spatial distribution of patches of back-scattered energy, and the motion of these patches. It is well known that radar systems respond primarily to short wavelength ocean waves, and other disturbances from millimeters to centimeters in scale. These short wavelength disturbances are in turn modulated by longer waves, by wind and by other factors. From observations of the properties and motion of the surface patches, various other types of information can be extracted, such as information regarding the sea state, wind speed and direction, ocean currents, the presence of surfactants such as oil from spills, and the presence of anomalous modulation patterns.

Unfortunately, the ever-present motion of the ocean surface causes distortions in the resulting imagery that can be severe. These distortions result from the very power of the SAR, the azimuth compression. The motion of the water surface produces Doppler shifts which "confuse" the SAR processor. Moving portions of the scenery are placed into incorrect azimuth locations, or may be severely smeared in azimuth. Periodic motions of the surface, such as from wave motion, can cause false patterns in the SAR images. Apparent wave motion, wave height, and wave direction can all be dramatically corrupted by a "velocity bunching" phenomenon inherent in SAR systems. This phenomenon is especially severe for radar systems with a large ratio of range to platform speed, referred to as the R/V ratio. Satellite systems, with inherently large range, suffer from this difficulty.

Another difficulty with radar systems is that the correlation of radar reflectivity and Doppler shift results in "radar beats," or long-wavelength patterns in the images. These radar beats contaminate both real aperture and synthetic aperture radar images.

In many applications, a particular type of target lends itself to characterization by a signal pattern that is easily separable from ambient wave pattern, or clutter. For example, separation can be effected in a frequency-wavenumber domain. One unfortunate effect of both radar beats and velocity bunching is that at least some of the clutter is repositioned in the frequency-wavenumber domain such that it interferes more directly with the desired signal and is much more difficult to separate. The net result is a dramatic reduction in detectability of the desired signal.

It will be appreciated from the foregoing that there is still much need for improvement in the field of processing of radar images of the ocean. In particular, what is needed is an effective technique for eliminating the effects of clutter caused by the ocean surface, and specifically to overcome the problems caused by radar beats and velocity bunching. The present invention is directed to these ends.

SUMMARY OF THE INVENTION

The present invention resides in a method, and corresponding apparatus, for reducing unwanted clutter in radar images of the ocean surface. The essence of the method is a step of deducing the nature of the true ocean surface that must have existed when measurements were made in order to produce the observations.

Briefly, and in general terms, the method of the invention comprises the steps of obtaining a series of spotlight mode synthetic aperture radar (SAR) images of a selected patch of the ocean surface; computing an estimate of the ocean surface parameters of the patch of the ocean surface as it was at the time that the spotlight mode SAR images were obtained; and modifying the spotlight mode SAR images, based on the ocean surface parameters, to remove distortion effects caused by movements in the ocean surface, and to produce clutter-reduced SAR images.

More specifically, the step of modifying the conventional SAR images includes computing expected SAR intensities from the estimated ocean surface parameters; comparing the expected SAR intensities to measured SAR intensities to obtain an intensity modulation field indicative of a possible target of interest; and correcting the intensity modulation field using surface wave motion data from the estimated ocean surface parameters, to produce an undistorted intensity modulation field indicative of the possible target.

The step of computing an estimate of the ocean surface parameters includes: making an initial guess of the ocean surface parameters based on environmental data; computing expected SAR intensities based on the estimated ocean surface parameters, and on a radar scattering model and an acquisition system model; comparing the expected SAR intensities with measured SAR intensities; updating the ocean surface parameters if the comparison is not favorable; and repeating the steps of computing expected SAR intensities, and comparing with measured SAR intensities, until a favorable comparison is made in the comparing step. Further, the method includes computing a likelihood value and a likelihood gradient associated with the measured SAR intensities and the expected SAR intensities. The expected SAR intensities are repeatedly calculated, based on an updated model of the ocean, until there is a desired degree of agreement, as measured by the likelihood and likelihood gradient, between the actual and estimated SAR intensities.

In one application of the invention, the method further includes the steps of comparing the clutter-reduced SAR images with a selected target signature; and estimating the probability that a target of the selected signature has been detected. The target signature may be of a surface vessel, or of a known ocean surfactant. In other applications of the invention, the method may also include the step of analyzing the clutter-reduced SAR images to produce weather and ocean current data.

In terms of apparatus, the invention comprises a SAR system for obtaining spotlight mode SAR images of a selected patch of the ocean surface, and a clutter reduction processor. The clutter reduction processor includes an ocean model, based initially on a guessed set of ocean surface parameters, means for computing, based on the ocean model, an estimate of the ocean surface parameters in the patch of the ocean surface as it was at the time that the SAR images were obtained, means for comparing the estimated ocean surface parameters with the actual SAR images, means for updating the ocean model if the comparison made by the means for comparing is not favorable, whereby the ocean model is repeatedly updated until the comparison is favorable, and means for modifying the SAR images to diminish effects of clutter caused by the ocean surface.

In one preferred form the apparatus may further comprise means for comparing the modified SAR images with a selected target signature image, to detect the presence and course of a selected target. In another form of the apparatus, the modified SAR images are used to monitor weather data such as sea state, wind velocity, and ocean current.

It will be appreciated from the foregoing that the present invention represents a significant advance in the field of synthetic aperture radar systems applied to observations of the ocean. In particular, the invention provides for the reduction or removal of clutter from SAR images of the ocean surface, to provide improved ocean surface images, or to facilitate detection and tracking of vessels, surface spills, or other surface conditions, or to facilitate the monitoring of weather and ocean conditions. Other aspects and advantages of the invention will become apparent from the following more detailed description, taken in conjunction with the accompanying drawings.

BRIEF DESCRIPTION OF THE DRAWINGS

FIG. 4A is an example of a true ocean wave field;

FIG. 4B is an example of a SAR image corresponding to FIG. 4A and showing effects of velocity bunching;

DESCRIPTION OF THE PREFERRED EMBODIMENT

Overview

Figure 1:
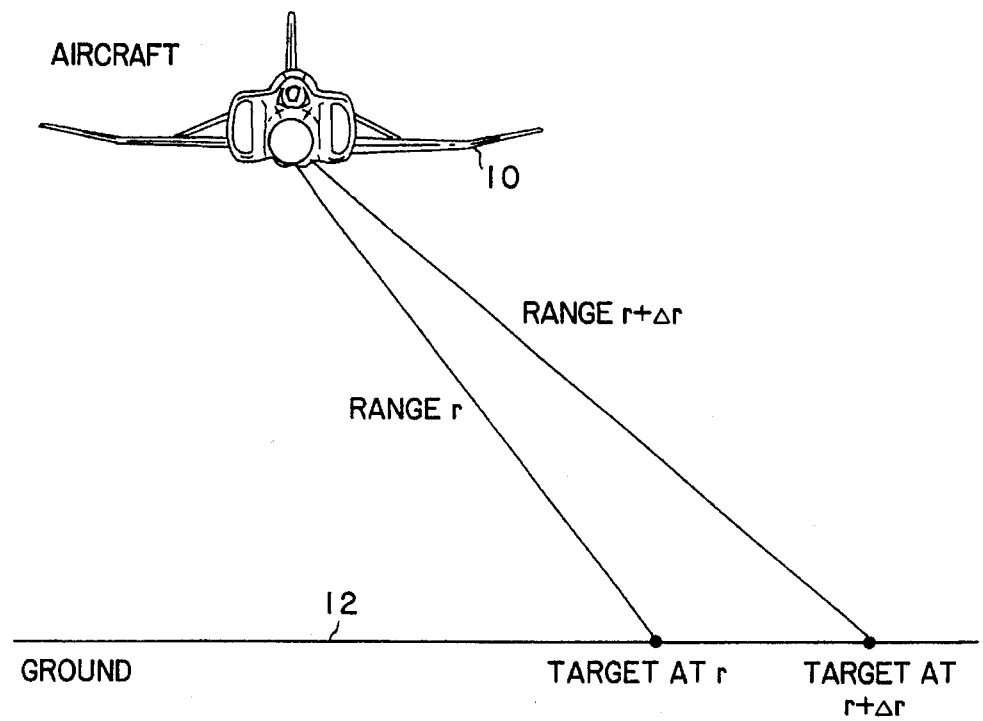
FIG. 1 is a diagrammatic view illustrating range resolution in a conventional radar system.
Figure 2:
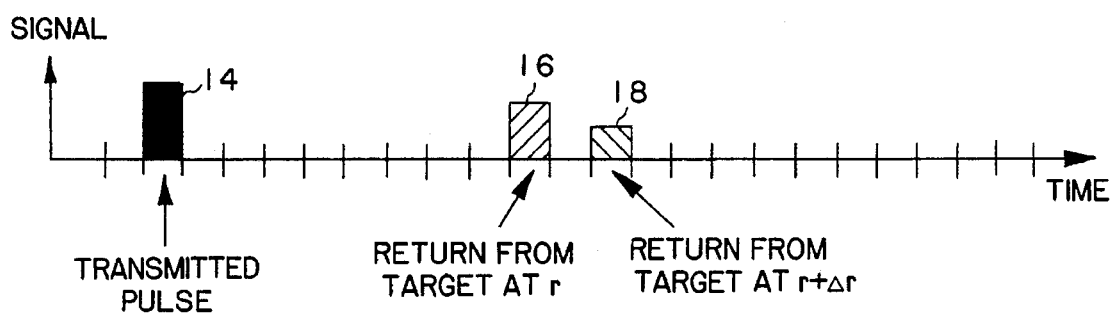
FIG. 2 is a timing diagram showing transmitted and return pulses in the radar system of FIG. 1.

As shown in the drawings for purposes of illustration, the present invention is concerned with a clutter reduction technique for use in a synthetic aperture radar (SAR) system. Radar has long been used to produce images of features on land and oceans, as viewed from above by systems installed in aircraft or orbiting satellites. FIG. 1 shows a range resolution technique for use on an aircraft, indicated by reference numeral 10, flying over the ground 12. By way of example, two target features are shown, at range r and at range r+Δr. As shown in FIG. 2, a pulse 14 transmitted from the aircraft 10 is returned from the first target (at range r) as indicated at 16, and is returned from the second target (at range r+Δr) at a slightly later time.

Figure 3:
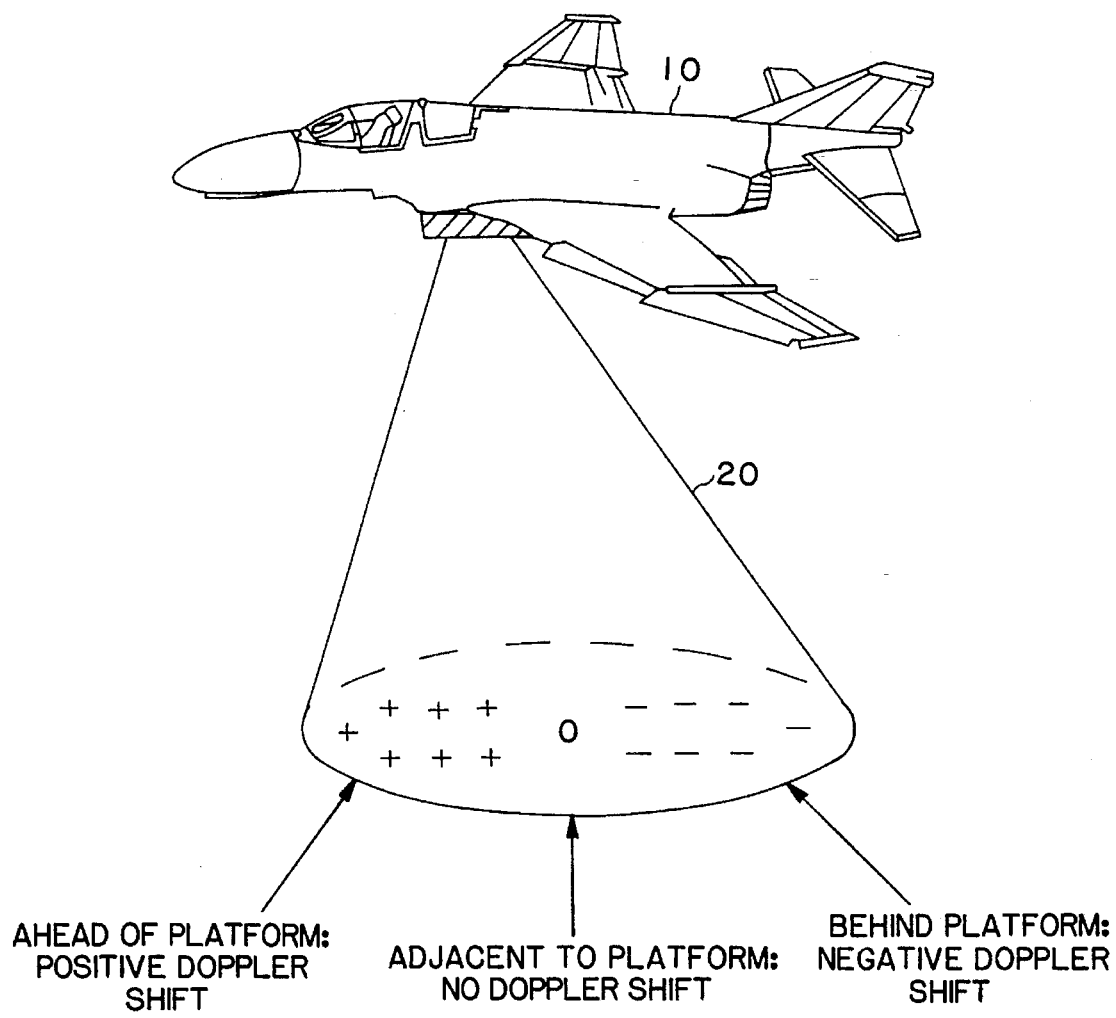
FIG. 3 is a diagrammatic view showing the principle of azimuth resolution using Doppler shift in a synthetic aperture radar (SAR) system.

In a SAR system, azimuth resolution is obtained using a Doppler shift principle, as indicated diagrammatically in FIG. 3, which shows an aircraft 10 and a downwardly directed diverging radar beam 20. For target features located toward the leading edge of the beam 20, the Doppler principle produces a positive Doppler shift, as indicated by the "+" symbols in the figure. Each ground feature indicated by a "+" symbol has a positive component of velocity relative to the aircraft 10, and the magnitude of that velocity component depends on the distance of the ground feature from a point vertically beneath the antenna. The detected Doppler shift allows the SAR system to compute the position of the ground feature with respect to the center of the beam 20.

At the very center of the beam, which is shown as being vertically oriented, and as indicated by a "0" symbol, the velocity of the ground feature relative to the aircraft is zero. For ground features on the trailing side of the beam, there is a negative Doppler shift, indicated by the "−" symbols in the figure.

FIGS. 4A and 4B depict one of the difficulties associated with SAR systems. FIG. 4A shows a typical ocean wave field, plotted in terms of the range and azimuth of the wave features. FIG. 4B shows the same wave field imaged by a SAR. A phenomenon known as velocity bunching distorts the surface wave amplitude, wavelength and direction.

Figure 5:
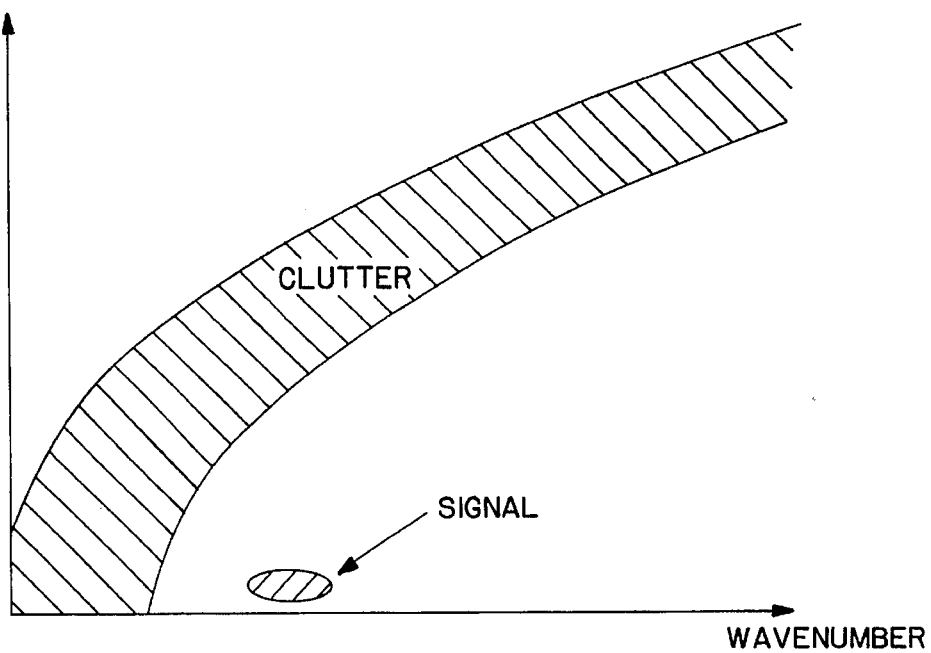
FIG. 5 is a graph showing the distribution of clutter signals with respect to a signal of interest.
Figure 6:
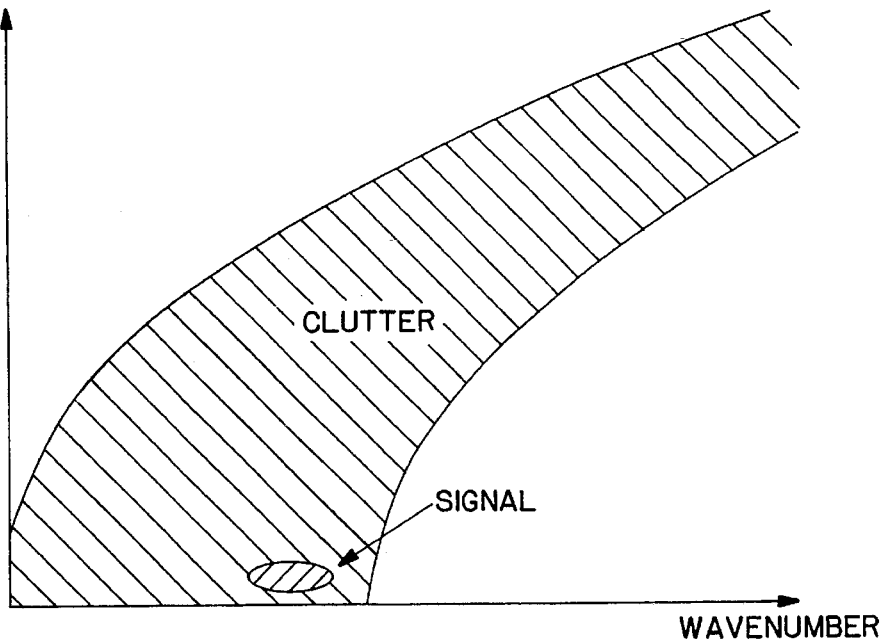
FIG. 6 is a graph similar to FIG. 5, but showing the distribution of clutter signals in a SAR image, in interference with the signal of interest.

FIGS. 5 and 6 illustrate another difficulty posed by SAR processing. FIG. 5 shows, for a real-aperture radar system, the distribution of ocean surface clutter and a signal of interest, both plotted in terms of frequency and a characteristic wave number. Although the clutter occupies a broad frequency and wave number spectrum, the signal of interest can usually be distinguished and separated from the clutter by its frequency, wave number, or a combination of these characteristics.

By way of contrast, FIG. 6 shows the same information as FIG. 5, but for a SAR system. The clutter is spread over a broader frequency and wave number range, to the point where it interferes with the signal of interest. Consequently, in SAR systems, separation of a signal of interest from the clutter due to unwanted surface reflections is extremely difficult.

Figure 7:
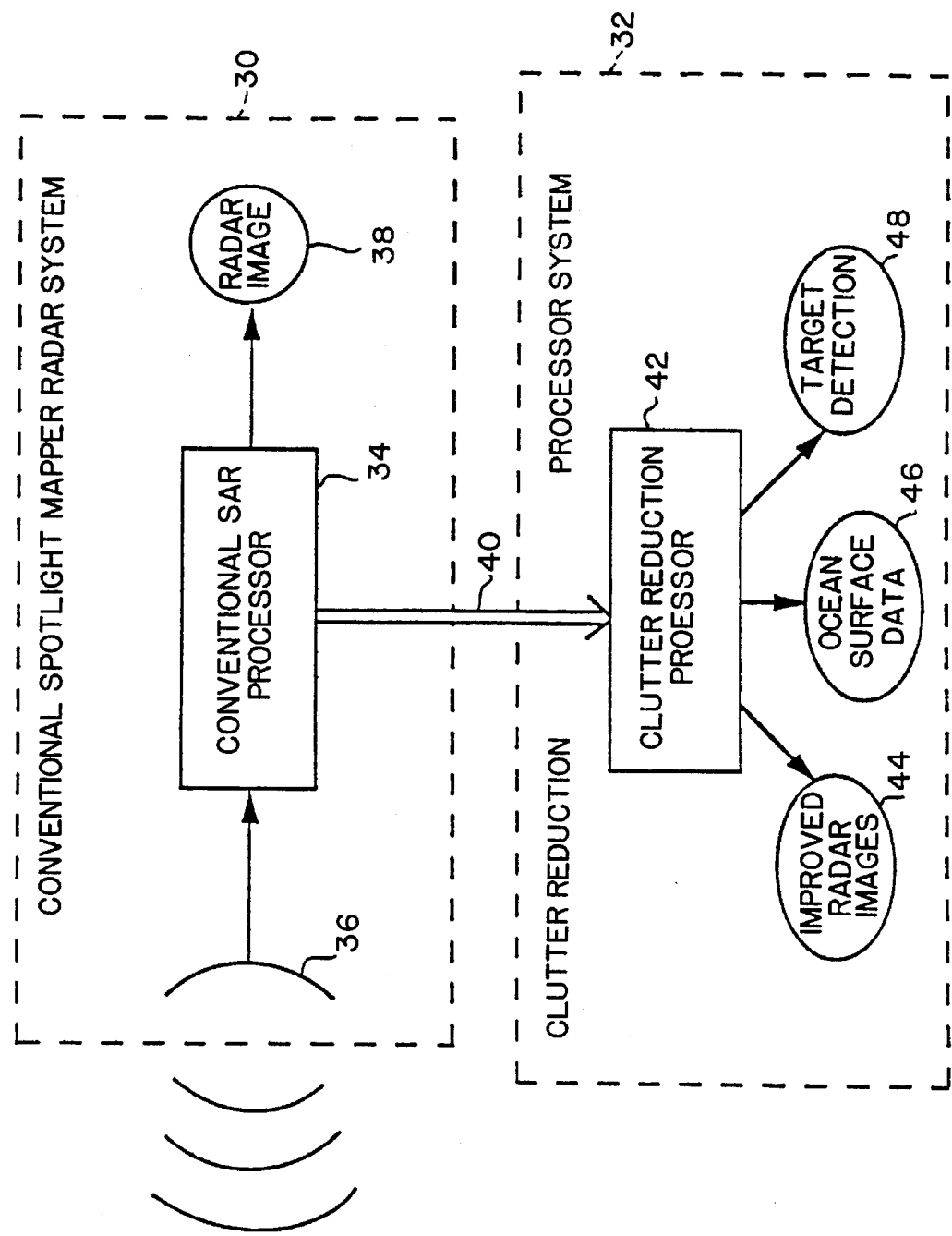
FIG. 7 is a block diagram showing a conventional spotlight mapper radar system used in conjunction with the clutter reduction processor system of the present invention.

In accordance with the present invention, image data from a conventional SAR system are subject to further processing by a clutter reduction processor, which produces improved radar images, ocean surface data, and target detection data. The invention at this broad level is shown diagrammatically in FIG. 7, which has two basic components: a conventional spotlight mapper radar system 30 and a clutter reduction processor system 32. The conventional spotlight mapper radar system 30 includes a conventional SAR processor 34 and associated antenna 36. The processor 34 produces conventional radar images, as indicated at 38, and outputs radar data on line 40 to the clutter reduction processor system 32. The latter includes a clutter reduction processor 42, which suppresses the clutter in a manner to be described in more detail, and produces three types of result data: improved (reduced-clutter) radar images 44, ocean surface data 46, and target detection data 48.

For the basic concept of the invention to work properly, four conditions must be met:
1. The same patch of water in the ocean or, more precisely, the same ocean wave energy, must be observed for a longer time interval than would ordinarily be used in ocean radar observations.
2. The clutter reduction processor 42 must include an ocean surface motion model that adequately describes the motion of the patch of water being observed.
3. The clutter reduction processor 42 must include a radar scattering model that adequately describes the actual process by which the incident radar energy is scattered by the ocean surface.
4. The clutter reduction processor 42 must be able to faithfully reproduce the effects of the radar acquisition system (the conventional spotlight mapper radar system 30).

Figure 8:
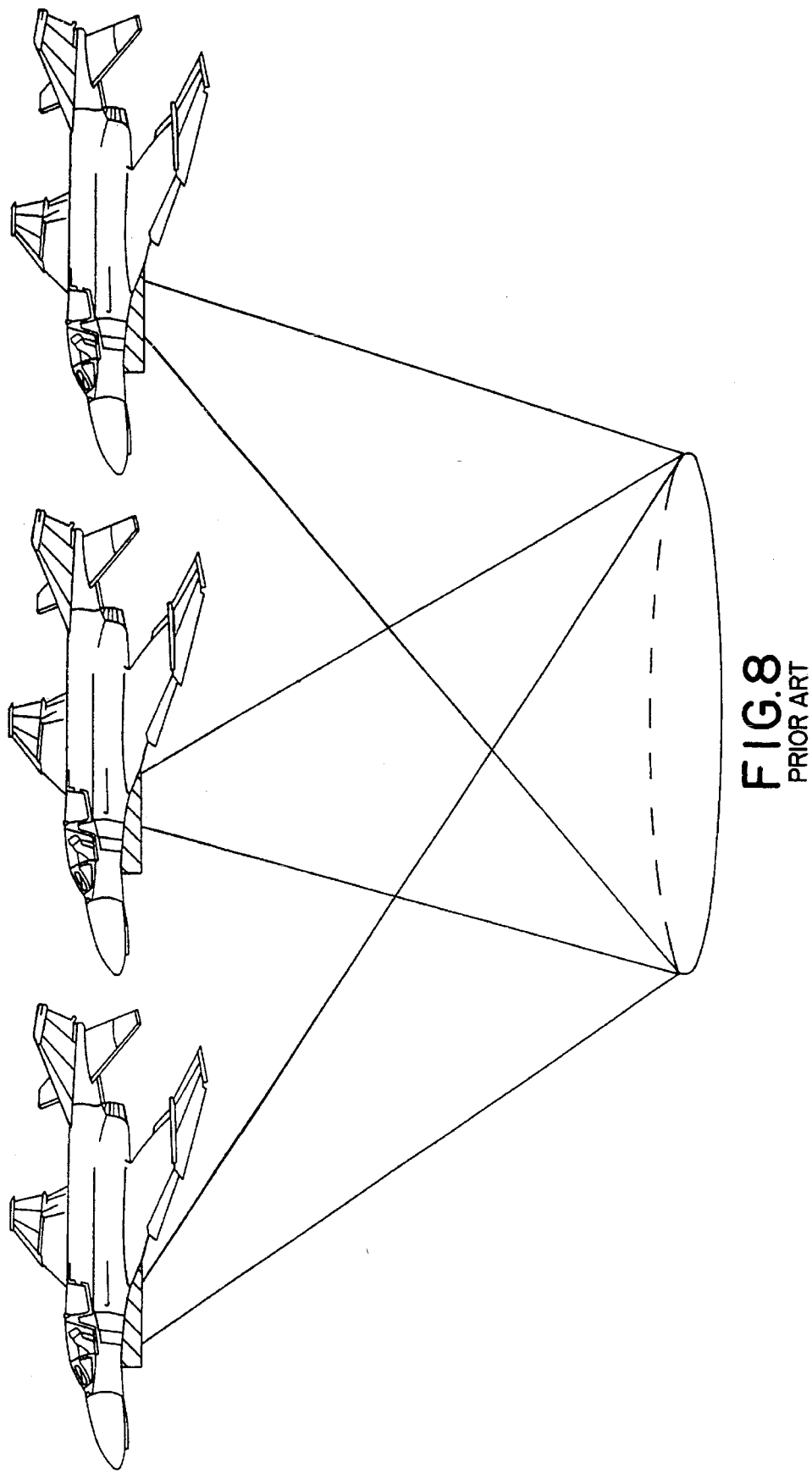
FIG. 8 is a diagrammatic view showing the principle of spotlight mapping radar.

The first condition above is satisfied by the use of a radar system operated in "spotlight" mode, as illustrated diagrammatically in FIG. 8. In spotlight mode, the radar beam is kept aimed at a patch of interest while the aircraft 10 passes overhead. The beam is pivoted from the front to the rear of the aircraft as the patch of interest is passed.

Figure 9:
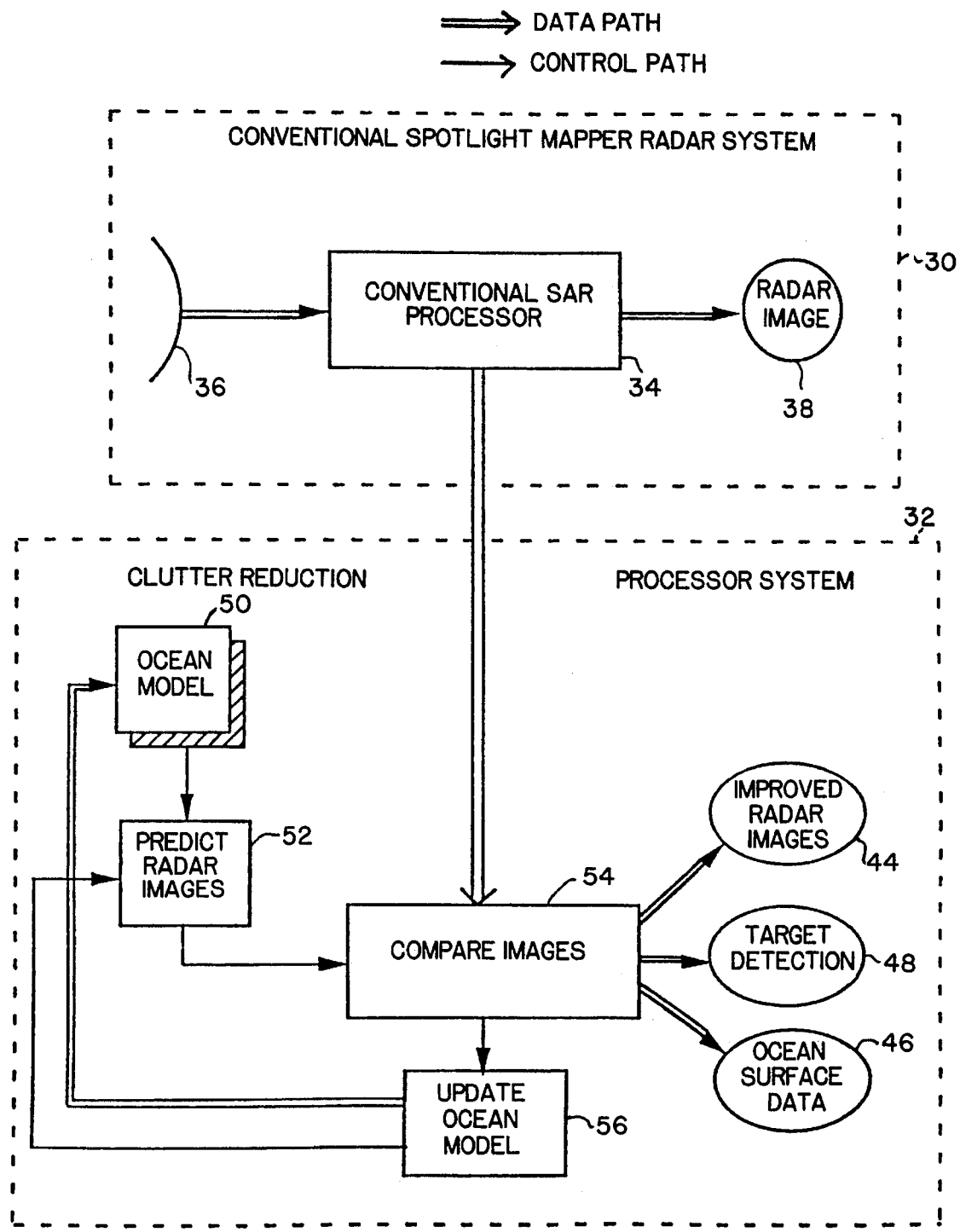
FIG. 9 is a simplified flowchart of the clutter reduction system of the invention.

FIG. 9 shows broadly the steps performed by the clutter reduction processor 42. An ocean model 50 is initially guessed, and then iteratively adjusted. As indicated in block 52, expected radar images are predicted using the ocean model, together with the radar scattering model and the reproduction of the radar acquisition system. As indicated in block 54, the predicted radar images are compared with the measured radar images. If the comparison is poor, within preselected limits, processing proceeds to the step shown in block 56, to update the ocean model. Then the step of block 52 is repeated, to obtain a new set of predicted radar images. When the comparison in block 54 results in a match, within the preselected limits, the ocean model is deemed to be accurate and may be used to produce the three types of output: improved radar images 44, ocean surface data 46, and target detection data 48. The specific manner in which these outputs are generated will become apparent from the more detailed description that follows this overview.

The applications of the present invention fall into four major categories:
(i) Detection, classification, identification, tracking, and monitoring of ships through the production of higher quality radar images.
(ii) Weather monitoring and prediction, through the production of high quality ocean data, including sea state and wind speed and direction.
(iii) Detection and monitoring of ocean currents and circulation for navigation, weather forecasting, global change monitoring, and other purposes, through the production of high quality ocean data.
(iv) Detection and tracking of oil spills on the ocean, through the production of higher quality radar images.

In brief, the clutter reduction system of the invention improves the quality of SAR images of the ocean and extracts other useful information. Before turning to a more detailed description of the invention, it is appropriate to identify its principal features and advantages.

First, clutter patterns caused by the medium to long wave motion of the ocean surface are attenuated in the system of the invention. Radar reflectivity cross-section maps can be obtained in such a way that they are largely free of the radar beats and velocity bunching that contaminate conventional radar imagery of the ocean. This improves the radar system performance in locating and identifying surface targets, such as ships.

Second, ocean surface and meteorological data, including ocean currents, wind speed and duration, wave motion, and so forth, are obtained. This is not possible with conventional radar imagery, except to very rough approximations at very coarse resolution (10 km or so).

Third, the detection, classification, and identification of anomalous ocean surface modulations are improved through the reduction of medium to long wave modulation and motion effects. This improves the radar system performance in finding hydrodynamic signals, such as ship wakes, and the manifestations of surfactants, such as oil from spills.

Fourth, the system of the invention is effective at high ratios of range to sensor platform speed and is thus applicable to satellite as well as to airborne sensors.

Finally, the system of the invention is effective with various types of SAR systems, such as extended dwell spotlight mapping SAR, multiple synthetic aperture radar, and displaced phase center along track interferometric radar (SAR/ATI).

Functional Description Using Flowcharts

Figure 10A:
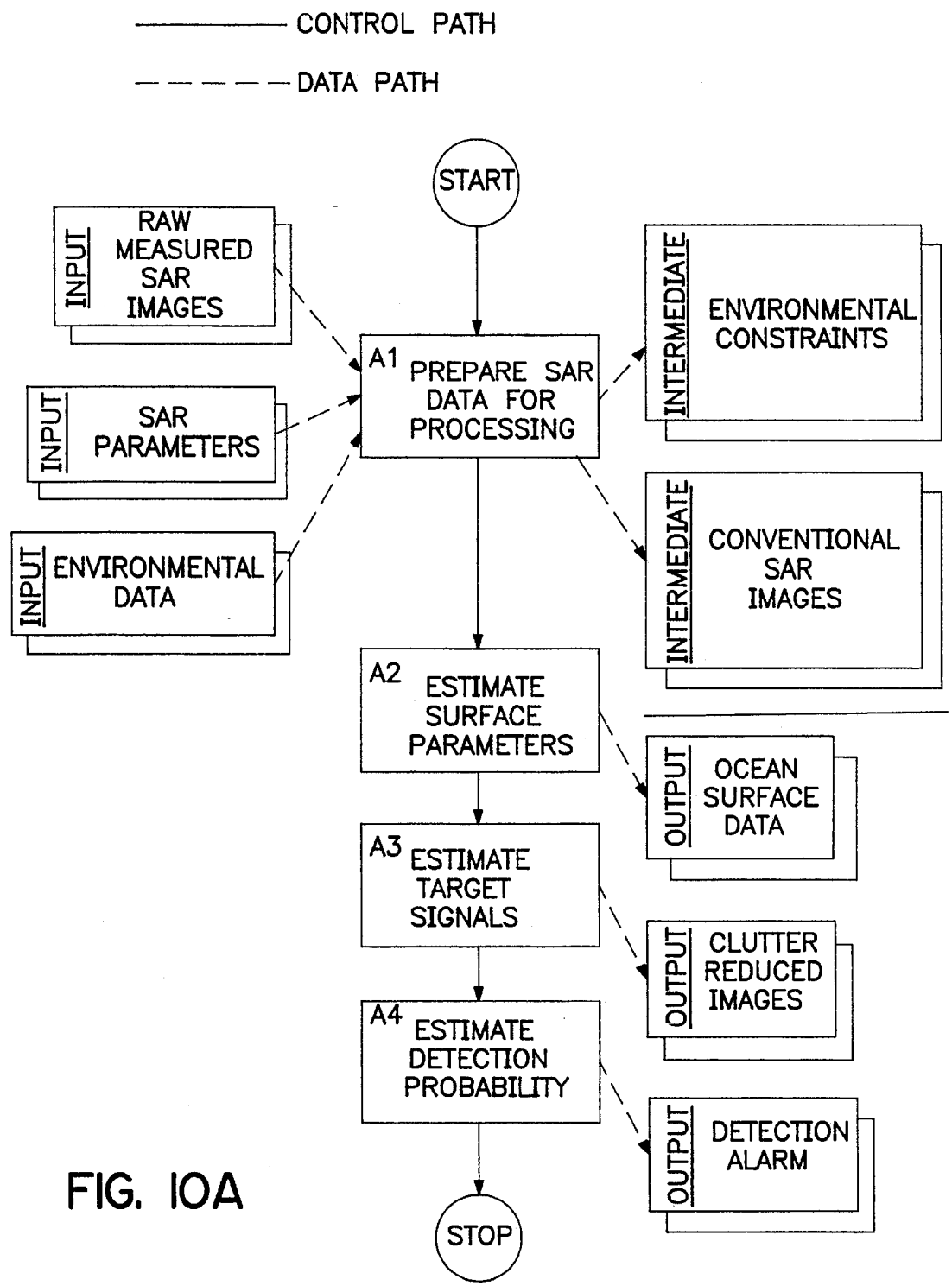
FIGS. 10A–10G together comprise a flowchart of the functions performed in the clutter reduction processor system of the invention.

The overall flowchart is shown in FIG. 10A, and subsidiary flowcharts are shown in FIGS. 10B-10G. The blocks in each flowchart are numbered using prefixes corresponding to the figure number. Thus, for example, the blocks in FIG. 10A are A1, A2, A3 and A4. In all of the flowcharts, solid lines between blocks indicate control paths and broken lines indicate data paths.

In brief summary, clutter reduction is accomplished by first obtaining high resolution estimates of the ocean surface wavefields (medium to long wavelength) and currents from extended dwell spotlight mode and/or interferometer SAR measurements. These estimates are obtained by relating the SAR images to the wave equations for surface waves, radar scattering, and SAR imaging processes. The wave equations represent an accurate model which predicts how the surface waves move and otherwise evolve with time. The radar scattering process is represented in the clutter reduction system by a computer implementation of a radar scattering model, which mathematically provides an accurate description of the natural process. This model predicts the backscattered radar energy, based on the ocean surface model. The SAR imaging process is represented in the clutter reduction system by a computer simulation of the underlying conventional radar system hardware an data processing. Then, the surface-wave-induced clutter may be predicted accurately and canceled effectively from the raw images.

Overall Flowchart

There are four main steps shown in the overall flowchart. In block A1, the SAR data is prepared for processing. This step simply puts the measured SAR data in forms convenient for subsequent processing. Input to this processing block are the raw measured SAR images, together with SAR parameters and environmental data. Data preparation may include basic SAR processing, as well as subsampling, interpolation and registering of images, and data editing to reduce severe noise. The purpose of subsampling, interpolation and registering is to assure that the "ground positions" of corresponding pixels in successive radar images precisely correspond.

The primary processing step, indicated in block A2, is the estimation of the ocean surface parameters from a collection of spotlight-mode SAR images. These ocean surface parameters are subsequently used to reduce clutter and refocus target signals that may be present in the data. Basically, this processing step works by inverting a model which allows the prediction of expected SAR images from a given set of ocean surface parameters. The ocean surface parameters that cause best agreement between the predicted and measured SAR images (in the maximum likelihood sense) constitute the output from this processing step. "Maximum likelihood" is a statistical concept that has a precise mathematical meaning, but for purposes of this description can be taken to mean "most likely."

A secondary processing step is employed, as shown in block A3, to estimate target signals. The surface wavefield parameters from the previous step are used to attenuate clutter in the SAR images caused by ambient waves and currents, and to refocus any target signals which may be present. This processing step has two parts. In part one, the measured data and the best predicted data are compared, thereby estimating modulations which will contain any signals. In part two, these signals are corrected for distortions due to azimuth shifts caused by range motion of the water surface, such as in velocity bunching.

In the final step, shown in block A4, an estimate is made of the probability of target detection. This assumes that the application of the invention is one involving the detection of surface anomalies known as "targets." Basically, this step decides whether a target has been detected and actuates an appropriate detection alarm.

Estimating Surface Parameters

Figure 10B:
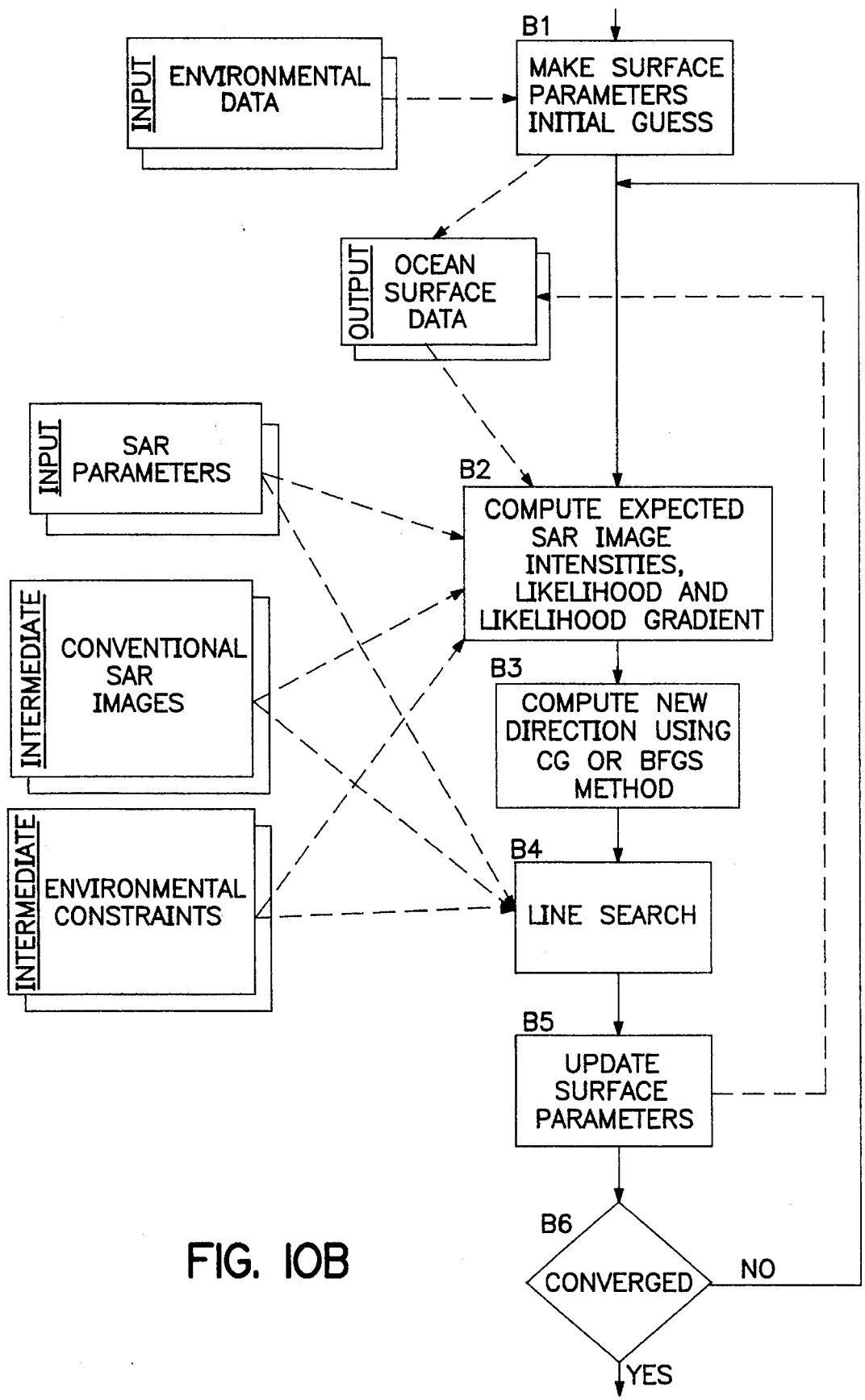

The step A2 of estimating surface parameters (in FIG. 10A) is expanded in FIG. 10B. The first step, shown in block B1, is to make a first guess at the ocean surface parameters. The first guess is based on whatever environmental data may be available, such as crude estimates of wind speed and direction, sea state, known ambient ocean currents, and so forth.

The next step, indicated in block B2, is to compute the expected SAR image intensities, the likelihood and the likelihood gradient. The SAR image intensities are computed based on the ocean surface data (of which an initial guess was made in block B1). With the addition of measured SAR data, the likelihood and likelihood gradient are computed. The likelihood is a measure of the probability that the measured SAR data would be observed, given that the estimated ocean surface parameters are correct.

The step described briefly in block B2, represents about half of the total computational cost of the clutter reduction processor. The step will be described in more detail with reference to FIG. 10E, and will be defined in mathematical detail in an appendix to this specification entitled "Surface Parameter Estimation." It is sufficient for the moment to understand that the processing performed in block B2 computes SAR image intensities, together with a likelihood function and its gradient, using as inputs the ocean surface data that has been initially estimated (and will be iteratively adjusted), the SAR parameters, and the conventional SAR images and environmental constraints derived as intermediate data in block A1 (FIG. 10A).

The next step, shown in block B3, is to produce a direction vector for a one-dimensional optimization search. One of two possible standard techniques may be employed: the conjugate gradient (CG) method or the Broyden-Flanner-Goldfarb-Shanno (BFGS) method, which are described in Press, W. H. et al., "Numerical Recipes—The Art of Scientific Computing," Cambridge University Press, 1986. A limited-memory version of the BFGS method is presently preferred, since the BFGS method requires fewer iterations and is more efficient computationally than the CG method. However, even in the limited-memory form, the BFGS method requires considerably more memory than the CG method. Therefore, the optimum choice for a given system depends on computer speed and available memory.

Once a direction vector is obtained (using the CG or BFGS method), a one-dimensional search, referred to as a line search, is performed, as indicated in block B4, to obtain an estimate of the local optimum point, i.e. the point of maximum likelihood. This is done using conventional bracketing and localization techniques, also described in the aforementioned text by Press et al. These techniques will be further described with reference to FIGS. 10F and 10G.

Upon completion of the line search, the current estimate of the optimum ocean surface data is updated, as indicated in block B5. Convergence of either the CG or BFGS method is detected, in block B6, by the failure of the likelihood to undergo further increase during consecutive iterations. Basically, convergence means that the ocean surface data are a true representation of the ocean conditions, within the limits of the method employed. If convergence is not reached, the steps in blocks B2–B5 are repeated and convergence is again checked in block B6. When convergence is attained, the step in block A2 (FIG. 10A) is complete.

Estimating SAR Intensities, Likelihood and Likelihood Gradient

Figure 10C:
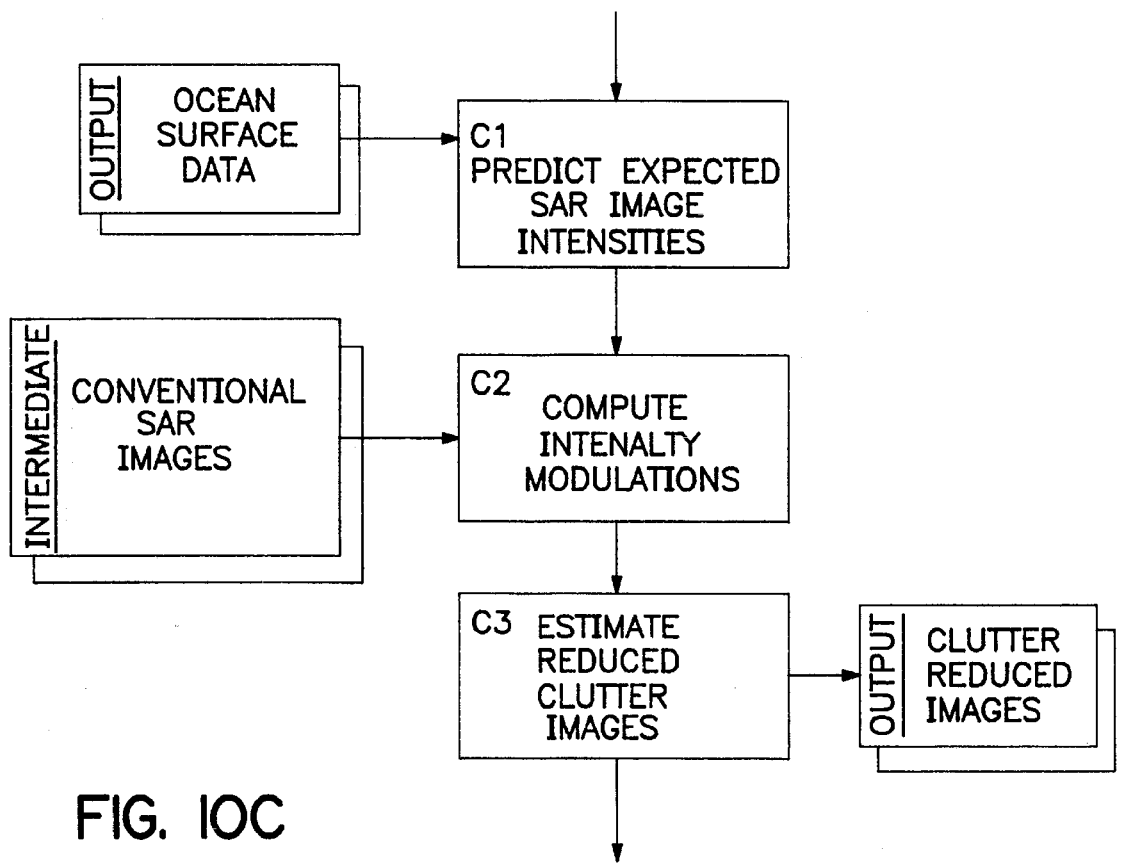
Figure 10D:
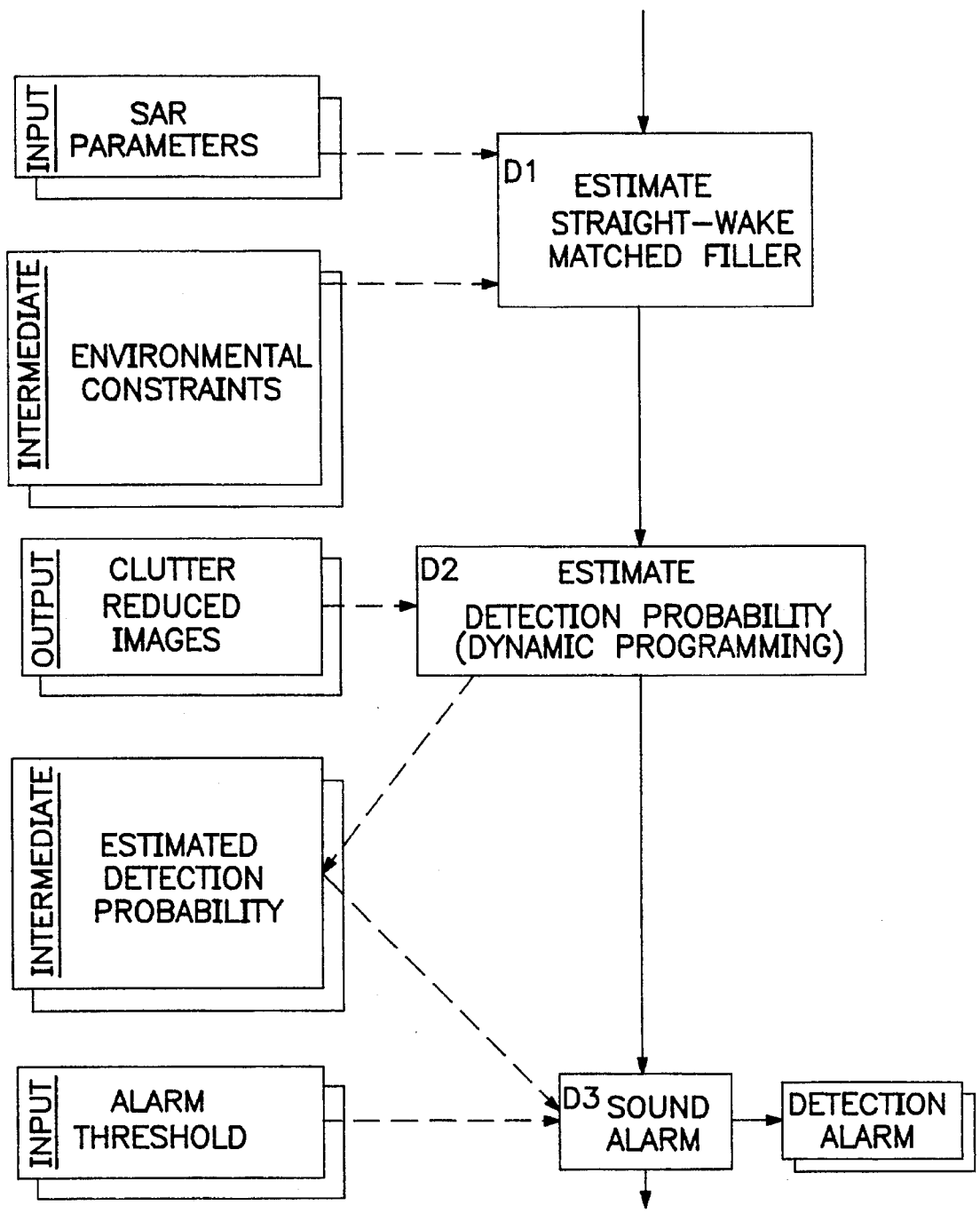
Figure 10E:
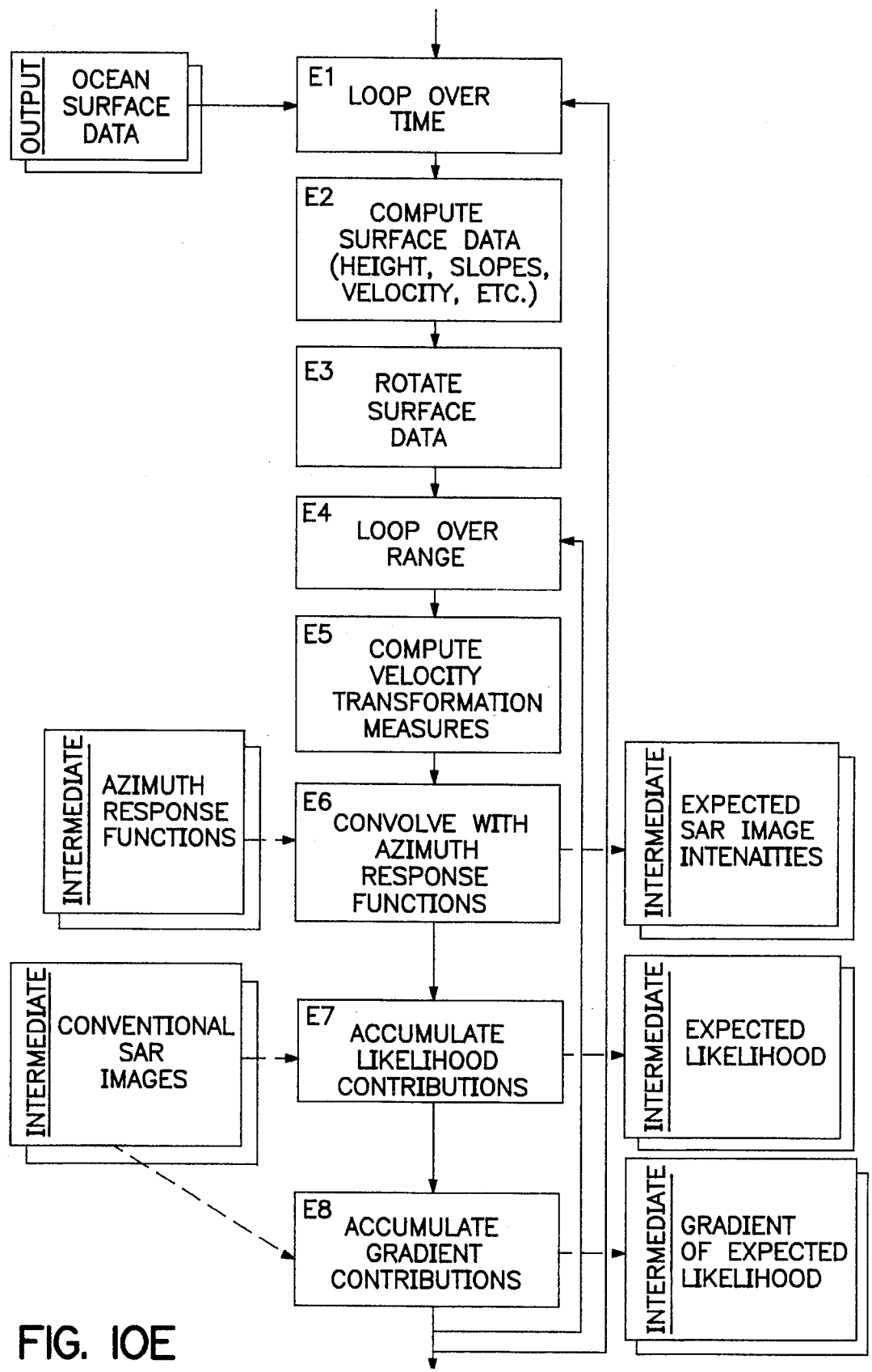

FIG. 10E shows more detail of the step (in block B2) of estimating SAR image intensities, likelihood and likelihood gradient. The caption in block E1 is "loop over time," which refers to the fact that a number of SAR images, such as 50 or 100, are used together in the processing system. Additionally, there is a formation time or integration time associated with each focused image. Within the formation time, the motion of the surface wavefield must be taken into account. The total observation time required to form all the images might be on the order of 50 to 100 seconds.

The next step, indicated in block E2, is to compute, based on the estimated ocean surface parameters, the surface data that pertains to the radar scattering process at the current time of interest. These parameters include the heights, slopes, and curvatures (for radar cross-section calculations), and additionally the range velocity (for Doppler spectrum calculations).

The next step, indicated in block E3, is to rotate the surface data to correspond to and be aligned with the measured SAR data. The rotation is performed based on the known SAR orientation with respect to the water at the current time of interest.

The next step, in block E4, is captioned "loop over range." Within each spotlight-mode SAR image, there a number of lines of constant range. For example, with a range processing resolution of three meters, and a scene range dimension of 1,500 meters, there would be 500 such constant-range lines. Within each constant-range line, azimuth processing is performed in the following steps, briefly described in blocks E5 through E8.

The step indicated in block E5 is to compute velocity transform measures. The major effect of range motion induced by the surface waves is to smear out and to shift in azimuth the local radar backscatter. The shifting is computed by analyzing the relationship between ground azimuth coordinates and apparent image azimuth. This relationship is called the velocity transform.

The next step, indicated in block E6, is to convolve with azimuth response functions. The smearing induced by range motion due to long wave surface waves may be modeled by azimuth response functions. These are computed by mathematical analysis of the local shapes and motions of the surface. Locally, the effect is described by a convolution with an azimuth response function. After this convolution is competed, the result is the expected image intensity.

The next step, performed in block E7, is to accumulate likelihood contributions. Associated with a measured SAR image and the corresponding computed expected image intensity is a likelihood, or probability. The likelihood contributions from each corresponding set of images are then accumulated to produce the total likelihood.

The final step in the flowchart of FIG. 10E, in block E8, is to accumulate likelihood gradient contributions. This is analogous to the accumulation performed for likelihoods, but instead accumulates an overall likelihood gradient. After the step in block E8, there is a loopback path to block E4 to cover other constant-range lines of the image, and an outer loopback path to block E1, to cover the entire formation time or integration time used in the computations.

Line Search in Estimating Surface Parameters

Figure 10F:
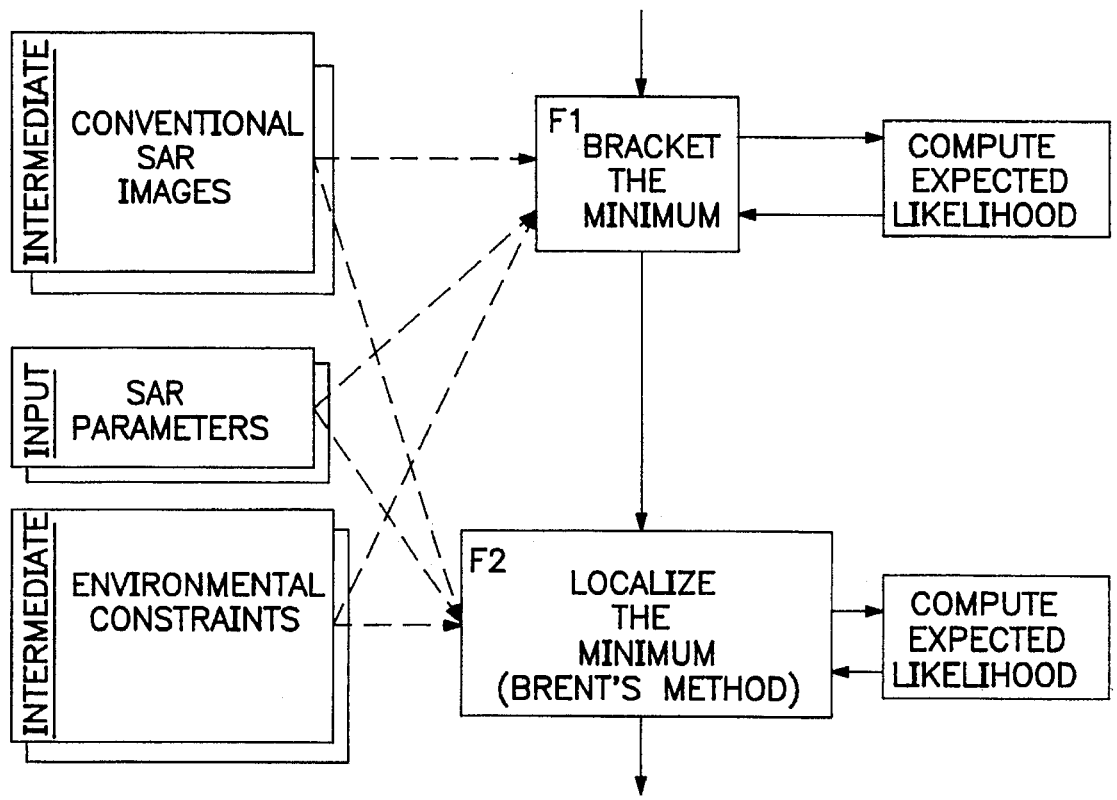
Figure 10G:
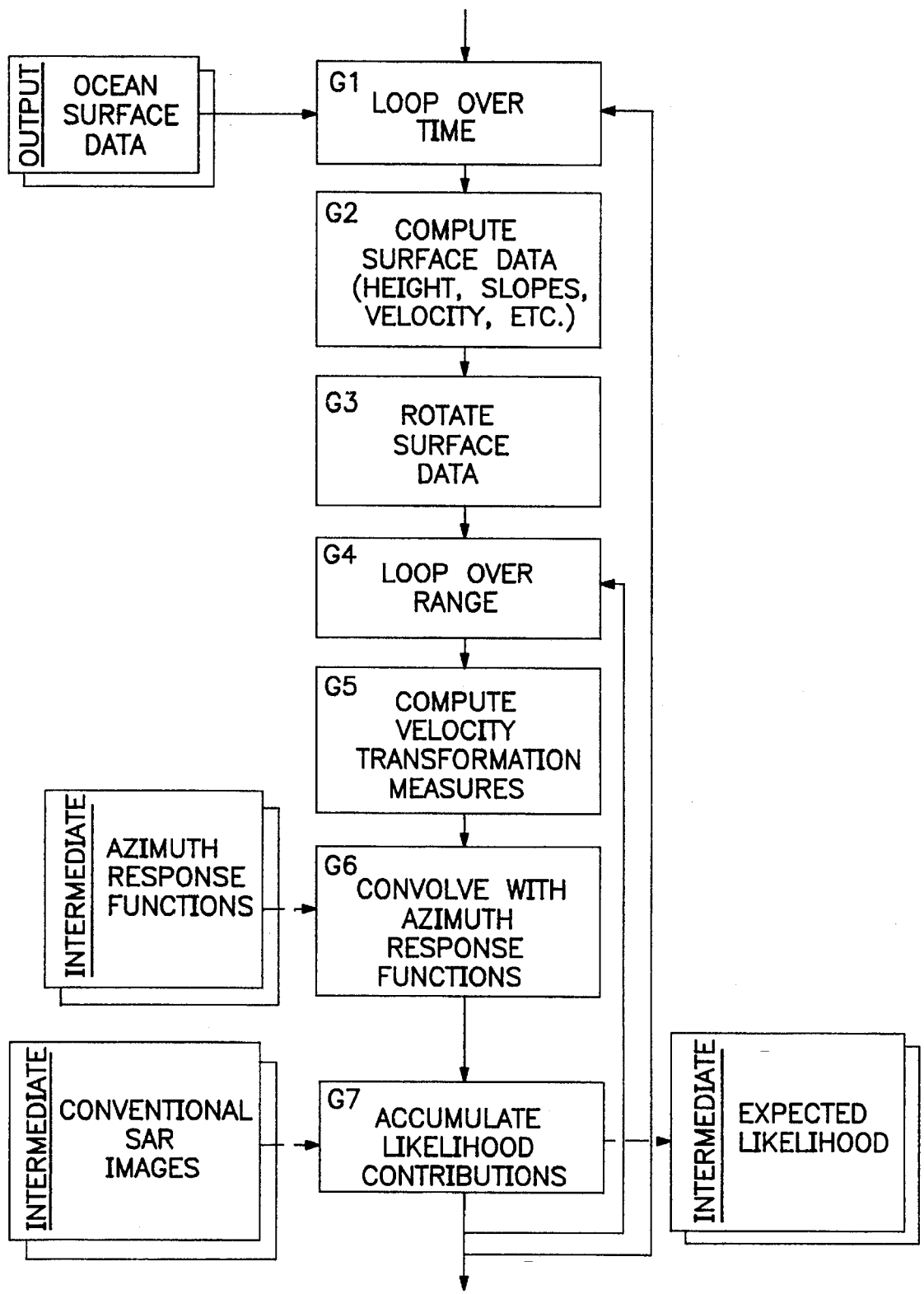

FIGS. 10F and 10G show the line search step (block B4 of FIG. 10B) in more detail. Basically the line search comprises two steps: bracketing the minimum (block F1) and localizing the minimum (block F2). Bracketing the minimum is performed using standard techniques, such as are described in the Press et al. text referenced above. The localizing step of block F2 uses Brent's method, which is also described in the reference. A maximum of 6–7 iterations is typically used.

The steps in blocks F1 and F2 also perform expected likelihood computations, as indicated in FIG. 10G. The steps in the latter flowchart are identical to those of FIG. 10E, except that there is no step of accumulating a likelihood gradient. More specifically, the steps are: (1) loop over time; (2) computer surface data (height, slopes, velocity, and so forth); (3) rotate surface; (4) loop over range; (5) compute velocity transform measures; (6) convolve with azimuth response functions; and (7) accumulate likelihood functions.

Estimating Target Signals

FIG. 10C shows in more detail the step (block A3) of estimating target signals after convergence has been reached in estimating the surface parameters. At this point accurate ocean surface data parameters are available. The first step, in block C1, is to compute expected SAR intensities, in a manner similar to that of block B2 of FIG. 10B, except that only the image intensities are computed, and not the likelihood or likelihood gradient. The various steps performed in block C1 include: (1) loop over time; (2) compute surface data (height, slopes, velocity, and so forth); (3) rotate surface; (4) loop over range; (5) compute velocity transform measures; and (6) convolve with azimuth response functions.

Then, in block C2, the predicted SAR image intensities are compared to the measured SAR data. The ratio of the latter to the former is interpreted as an intensity modulation field. If target signatures are present in the measured data, they will be present and enhanced in this modulation field.

Finally, in block C3, reduced-clutter images are generated. Using the estimated surface wavefield parameters (the ocean surface data), and the intensity modulations computed in block C2, an undistorted modulation field is computed. This is accomplished by inverting the azimuth shifts induced by the surface wave motion. Surface range velocities are computed using the ocean surface data.

As discussed previously, motion of the water surface causes a conventional SAR processor to misplace in azimuth moving portions of the scenery, or to smear out or distort the azimuth character of the radar return. This process can be formulated mathematically, as discussed in the accompanying appendix material. In this formulation, once the motion of the water surface is known, the conventional SAR images are represented as known filters applied to the true radar images. Since the filters are known, their effects can be eliminated by the process of mathematical inversion. One complicating factor is the need for stabilizing the inversion due to the low-pass nature of the filters.

It is preferable to perform this inversion on the "decluttered" data rather than the raw conventional SAR images in cases of very low signal-to-clutter ratio (the magnitude of the target modulation field compared to the clutter). This is because the inversion process inevitably is imperfect, and will introduce larger errors if applied to the raw data than to the "decluttered" data.

Estimating Detection Probability

The step identified in block A4 of FIG. 10A is shown in more detail in FIG. 10D. There are two major subsidiary steps: estimating a straight-wake matched filter (block D1) and estimating detection probability using dynamic programming (block D2). Using the environmental data, such as wind and sea state, and information about possible hard target types, such as sizes and speeds, hypothetical target signatures are estimated that would be expected in the absence of shear and other ambient distortion effects. The methods for obtaining these signatures are not critical to the present invention and are not described here. Once these theoretical target signatures are obtained, the probability of detection of a target is estimated (in block D2), and an alarm is actuated if the probability exceeds a preselected threshold. Basically, the clutter-reduced images obtained in block A3 (FIG. 10A) are applied to optimally distorted matched filters representative of the target signatures.

Figure 11A:
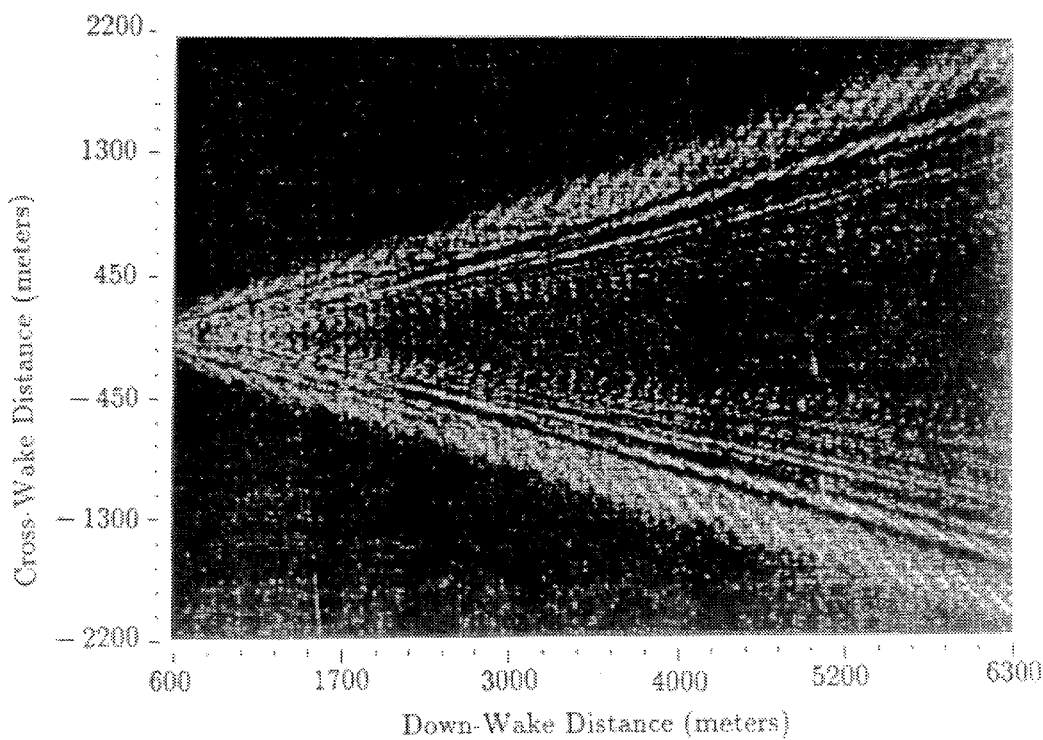
FIGS. 11A and 11B are examples of simulated SAR images of surface wakes of a ship.
Figure 11B:
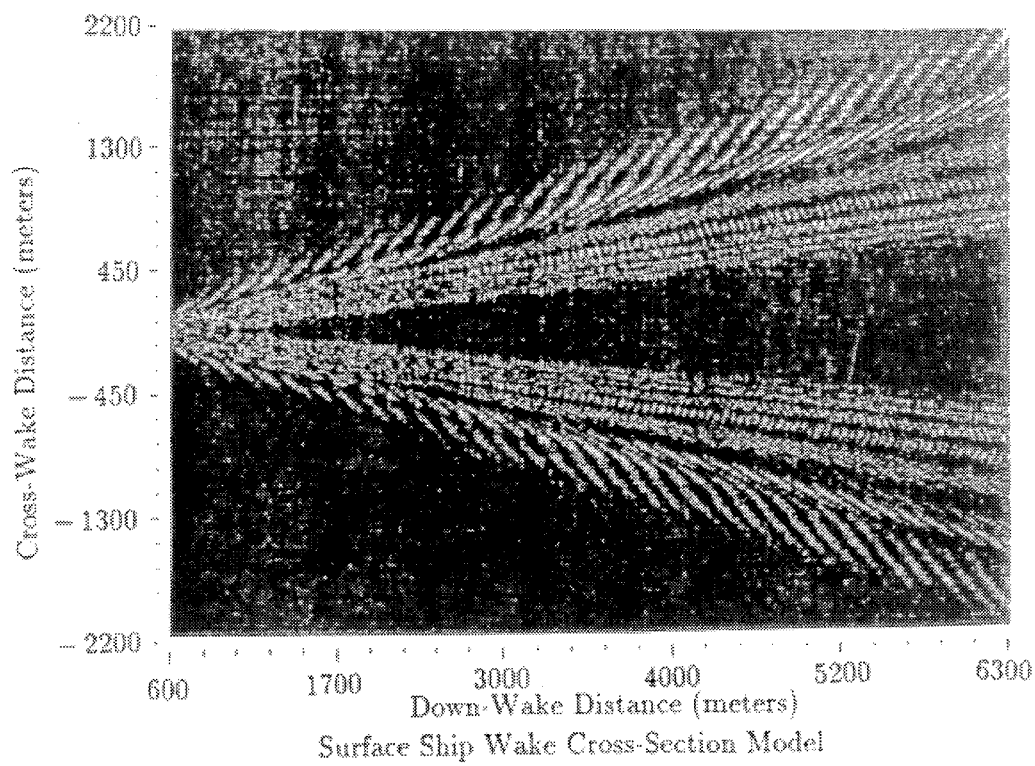
Figure 12:
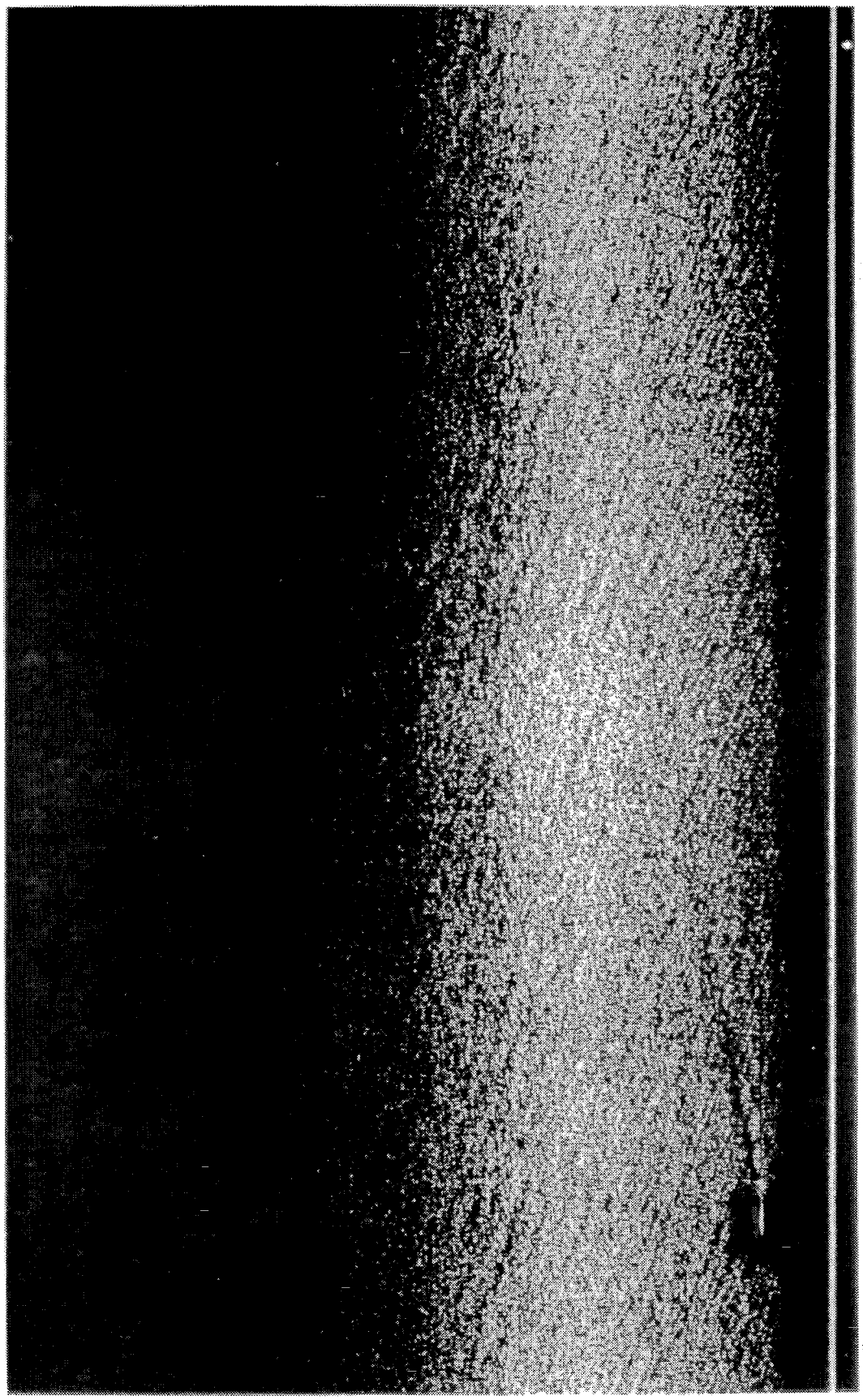
FIGS. 12 and 13 are examples of actual SAR images of a surface ship and its wake.
Figure 13:
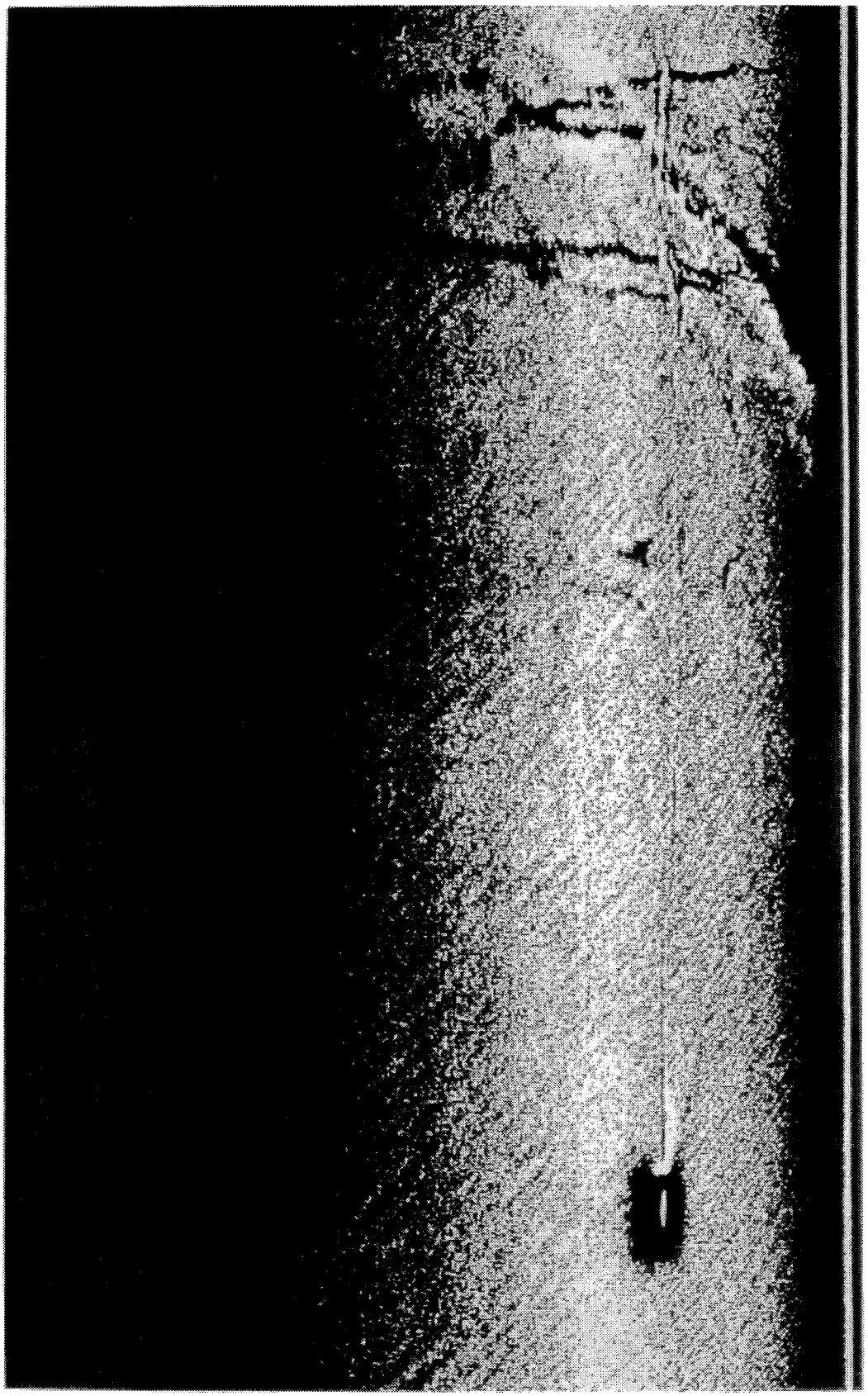

By way of example, FIGS. 11A and 11B show modeled surface ship wake current and radar cross sections, based on a ship of a certain displacement and speed. This signature is similar to some observed in actual radar images, as shown in FIG. 12. FIG. 13 is another example showing that the wake can be much larger than the ship return (the white speck in the lower left-hand corner of the figure). However, the ideal straight wake has been distorted due to currents, and is clearly curved.

Dynamic programming is a mathematical or numerical technique for solving a multistage decision process in which an outcome is assigned at each stage. See, for example the text by R E Bellman, entitled "Dynamic Programming," Princeton Univ. Press, 1957. Here, the problem is to find the trajectory of an ideal wake which best matches an observed signature. Starting at one end of the wake, the algorithm proceeds along the general direction of the wake and at each stage, finds the trajectory segment which maximizes the cross-correlation of the ideal wake data (radar cross-section) with the target modulation field obtained in step B3.

A complicating factor is the need for penalizing hypothetical trajectories, which are "unphysical," considering the wind and seas states, and the ocean currents obtained using the ocean surface data.

Conclusion

The mathematical basis for the estimation of surface parameters is provided in the appendix material following this description and immediately preceding the claims.

It will be appreciated from the foregoing that the present invention represents a significant advance in the field of radar systems as applied to observations of the ocean. In particular, the invention provides a novel approach for removing unwanted clutter from radar images of the ocean surface. The invention may be applied to produce clutter-reduced radar images of the ocean surface, to improve the probability of detection of hard targets on the ocean, and to provide an accurate estimate of surface parameters of the ocean. A detailed embodiment of the invention has been described for purposes of illustration, but it will be understood that various modifications may be made without departing from the spirit and scope of the invention. Accordingly, the invention is not to be limited except as by the appended claims.

SURFACE PARAMETER ESTIMATION

1. Overview

We now describe the mathematical details of the SAR-CRS algorithm, which estimates ocean data via the maximum likelihood method for extended observation time, two-dimensional, synthetic aperture ocean imagery. A computationally efficient approach to implementing the evaluation of the likelihood function and its gradient with respect to the surface wave Fourier amplitudes is obtained by the use of the velocity bunching transformation mapping the ground azimuth to image azimuth coordinates. The overall flow of the basic computation is then given demonstrating that apart from the integral transformation the numerical evaluations can be implemented via Fourier transforms, vector inner products and convolutions, i.e., with standard signal processing algorithms susceptible to high speed software/hardware implementations.

2. Preliminaries

The fundamental physical quantity governing ocean SAR imaging is the Doppler spectrum of the complex surface electromagnetic reflectivity function and its parametric dependence on the surface wave variables prevailing within a SAR range and azimuth resolution cell during the course of collecting the measurements required to form a SAR image. The principal mechanisms by which the SAR image intensity is affected by the surface gravity waves are wave induced radar cross section modulations and azimuth shifting produced by the velocity bunching mechanism. These observations lead to the idea of utilizing a representation of the Doppler spectrum of backscattered radiation from a SAR resolution cell positioned at $\vec{x}$ in the vicinity of time t in the form $$\zeta(\Omega,\vec{x},t)=\sigma(\vec{v}(\vec{x},t))\hat{S}(\Omega,\vec{v}(x,t)) \qquad 3.1$$

where $\sigma$ is the radar cross-section and $\hat{S}$ is the Doppler spectrum normalized to unit power. As shown the dependence of $\zeta$ on position $\hat{x}$ and time t is not explicit but enters through the dependence of $\zeta$ upon local surface quantities $\hat{v}$ representing averages of wave properties such as the small scale surface roughness, mean radial velocity, radial velocity spread, average line of sight slope, etc. The variation of these parameters in space and time is the result of the their dependence on the instantaneous configuration (and perhaps immediate past history) of the surface gravity wave field, and thus these parameters evolve along with the surface wave system. The basic assumption of the processing technique described here is that these dependencies of the scattering Doppler spectrum provide an adequate statistical description of the surface reflectivity function for signal processing purposes. Moreover we shall assume that given a set of local surface wave properties prevailing over a small region of space and time, that the backscatter forms a locally stationary, zero mean, complex multivariate Gaussian random process. We refer to these assumptions as the conditional Gaussian model. Note that the composite multivariate random space-time scattering reflectivity process described by such a model can be highly non-stationary and non-Gaussian owing to the space time variability of the underlying parameters determining the local Doppler spectrum.

If we further assume that variations in the rms level of radial velocity spread of surface scattering facets (arising from the motion of sub-resolution scales waves) within a resolution, does not vary strongly from position to position, i.e. that the intermediate wavelength surface waves remain everywhere near saturation (as predicted by most surface wave spectral models), then the shape of the conditional normalized scattering Doppler spectrum will remain approximately constant i.e., the Doppler width and higher order moments are not strongly modulated by the longer surface gravity waves which we are attempting to determine. In this case the properties in primarily affected by long waves are the Doppler centroid position and the total radar cross section. Thus, the form of $\hat{S}$ becomes independent of position on the surface. When this latter is a satisfactory approximation, variations in $\hat{S}$ enter through the local wave induced mean radial velocity field which shifts the effective origin of $\hat{S}$ (i.e., velocity branching), whereas the local radar cross section (RCS) is affected by the average surface facet tilt, hydrodynamic long wave short wave interaction effects, etc. Note that the forms assumed allow for correlated fluctuations in Doppler centroid and RCS via any relation between the the net radial velocity and other RCS modulating parameters of the underlying wave field.

In cases where more than one microwave scattering mechanism is significant, e.g. combined specular and Bragg scattering, we will generally require differing forms for the normalized Doppler spectrum for the contribution of each mechanism in addition to the corresponding dependencies of the separate contributions to the total RCS upon the underlying wave parmeters. In such a case the appropriate generalization of 3.1 suitable for implementation via the algorithms to be discussed here is the representation, $$\rho(\Omega;\vec{v}) = \sum_n \sigma_n(\vec{v})\hat{S}_n(\Omega;\vec{v}) \qquad 3.2$$

where the summation is over all significant scattering mechanisms which produce normalized Doppler spectral forms sufficiently different to warrant the additional computational complexity involved. Clearly the above procedure can be generalized to encompasses additional sources of surface reflectivity modulation. Indeed, a major challenge to the present enterprise is to obtain a suitably validated form for the effects of fluctuating wind stress and wind drift layer variability on the surface reflectivity fluctuations especially for high frequency radars, for which the Bragg wave components of the surface respond very rapidly to changes in wind conditions.

3. Numerical Evaluation of the Likelihood Functional and Gradient

For conditionally Gaussian backscatter, the multilook probability density function for ocean SAR intensity imagery is given by the gamma. distribution, $$P_N(I(r,x,t)|\mu(r,x,t)) = \frac{I(r,x,t)^{N-1}}{\Gamma(N)\mu(r,x,t)^N} e^{-\frac{I(r,x,t)}{\mu(r,x,t)}} \qquad 3.3$$

where $I(r,x,t)$ is the N-fold sum of the measured single look intensities with each look assumed to be independent and identically distributed, and $\mu(r,x,t)$ the expected value of a single look intensity map, both defined as functions of radar range r, azimuth x and image formation time t. This distribution occurs when the complex backscatter from a given region obeys the complex Gaussian assumptions previously stated. When the scattering from distinct spatial cells is uncorrelated and the reflectivity correlation time is smaller than the image formation time, the logarithm of the total image likelihood function is then given by, $$-\ln(\mathcal{P}) = \sum_t \int_r \int_x \left\{ -(N-1)\ln(I(r,x,t)) + N\ln(\mu(r,x,t)) + \ln\Gamma(N) + \frac{I(r,x,t)}{\mu(r,x,t)} \right\} drdxdt \qquad 3.4$$

where the integration is over ground range r, SAR azimuth x, and SAR image formation center time t. The r,x integral form is meant to be notational only. In practice synthetic aperture formation as well as numerical evaluation requires a sumsnation over discrete range and azimuth cells. The time indexing refers to the nominal epoch of SAR image formation, i.e., each image actually involves a finite duration T over which one or more synthetic apertures are formed by platform motion. The total sequence of images thus forms a kind of SAR movie of the ocean surface with the observed variations in each image arising from the variable surface configurations as the surface wave structure evolves.

In 3.4 we have taken the image response in each pixel to be statistically independent of all other pixels, which is consistent with the assumption of the spatially uncorrelated Gaussian nature of the underlying complex reflectivity function.

The underlying model for the expected value of the single look intensity function I is given by, $$\mu(r,x,t) = \int \sigma(r,y,t) S(r,t,x-y-\gamma u_r(r,y,t)) dy + \mathcal{N}_0 \qquad 3.5$$

where $\sigma$ is the radar cross section, S the surface scattering normalized Doppler spectrum, $\gamma$ the slant range to platform azimuth velocity ratio $$\frac{R}{V} = \frac{R}{V\sin(\psi)}$$

where V, is the platform speed and $\psi$ is the squint angle for the image(s) formed around time t. $u_r(r,y,t)$ denotes the mcan wave induced radial velocity within the SAR resolution cell positioned at ground range r, true ground azimuth y and averaged over the SAR image formation time associated with generation of the image indexed by t where r and y are measured relative to the mean radar platform position during coherent integration around image index time t. $\mathcal{N}_0$ is the radar thermal noise density referred to ground radar cross section per pixel area. Tile form of the Doppler spectrum S must include the effects of finite SAR image formation time (i.e., the SAR azimuth impulse response function) when the width of the latter is not negligible compared to the intrinsic Doppler spread of scattering facets within the cells. Note that the argument to S is an azimuth displacement function, i.e., frequency has been scaled to azimuth displacement by the ground Doppler gradient of the radar by division of the Doppler frequency $\Omega$ by $2k_r V/R = d\Omega/dx$, where $k_r$ is the radar electromagnetic wavenumber ($2\pi/\lambda$), and $\Omega$ is radian Doppler frequency.

Processing of SAR imagery for the recovery of the ambient wave motions responsible for producing the observed intensity modulations requires the evaluation of 3.4 and the gradient of 3.4 with respect to the surface wave parameters. In the following we assume that the wave surface elevation function $\zeta$ is given by, $$\zeta(\xi,\eta,t) = \sum_{k,l} \beta_{k,l} e^{i(k\xi + l\eta - \omega t)} \qquad 3.6$$

with the reality condition, $$\beta_{k,l} = (\beta_{-k,-l})^*$$

where $(\xi,\eta,\zeta)$ are a fixed ground reference system of Cartesian coordinates and $\beta_{l,k}$ are the Fourier coefficients of the gravity waves and $\omega$ is given from linear gravity wave theory by, $$\omega(k,l) = \sqrt{g}\ (k^2 + l^2)^{1/4} = \sqrt{g\kappa} \qquad 3.7$$

The above should be utilized only for surface wavenumbers l,k such that $\omega(l,k)T \ll 1$, where T is the SAR integration time for the formation of a single image. This restricts the attainable resolution of the surface wave structure. Assuming that information about a wave can be obtained only if the SAR coherent integration time is less than or equal to about ¼ of a wave period, while the nominal azimuth resolution must be less than or about ¼ of the corresponding surface gravity wave length, we have the relation, $$\lambda_{min} > \left[ 4\sqrt{\frac{2g}{\pi}} \ \frac{\lambda_r R}{V} \right]^{2/3} = \left[ \frac{32 g \lambda_r^2 R^2}{\pi V^2} \right]^{1/3}$$

where $\lambda_{min}$ is the minimum resolvable surface wavelength and $\lambda_r$ is the radar wavelength. Typical values for an X-band system operating at $$\frac{R}{V} = 100$$

allow for the resolution of wavelengths of 8 to 10 meters. In practice higher range and SAR azimuth resolution than indicated here is desirable and probably necessary in order to attain a sufficient level of speckle diversity to render the RCS modulations induced by the wave effects unambiguously measurable. For most sea states resolution of surface wavelength's in excess of 10 meters should suffice to produce significant suppression of surface gravity wave induced artifacts.

The maximum likelihood processing of the measured intensity images $I(r,x,t)$ consists of the selection of $\beta_{k,l}$ so as to minimize 3.4 through the predicted imaging relation 3.5. The radial velocity $u_r$ is derived from the elevation function $\zeta$ by noting that the radar line of sight velocity of a fluid particle is given by, $$u_r = \cos\theta \frac{\partial \zeta'}{\partial t} + \sin\theta\cos\phi \frac{\partial \xi'}{\partial t} + \sin\theta\sin\phi \frac{\partial \eta'}{\partial t} \qquad 3.8$$

where $\zeta'$ and $\xi'$ and $\eta'$ are the components of the wave surface position in the $(\xi,\eta,\zeta)$ system, $\theta$ the radar incidence angle measured frown nadir, and $\phi$ the azimuth angle between the $\xi$ axis and the radar ground range axis r. From the linear wave representation 3.6 we may express $u_r$ as, $$u_r = \sum_{k,l} \omega \left\{ -i\cos\theta + \frac{k}{\kappa}\sin\theta\cos\phi + \frac{l}{\kappa}\sin\theta\sin\phi \right\} \beta_{k,l} e^{i(k\xi + l\eta - \omega t)} \qquad 3.9$$

or $$u_r = \sum_{k,l} -\omega \left[ \frac{b}{\kappa} (k\sin\theta\cos\phi + l\sin\theta\sin\phi) - a\cos\theta \right] \cos(k\xi + l\eta - \omega t) \qquad 3.9a$$

$$-\omega \left[ \frac{a}{\kappa} (k\sin\theta\cos\phi + l\sin\theta\sin\phi) - b\cos\theta \right] \sin(k\xi + l\eta - \omega t)$$

where $\beta = a - ib$. Similarly we can obtain for the line of sight component of the surface wave slope, $$\zeta_r = \frac{\partial \zeta}{\partial r} = \Sigma i\{k\cos\phi + l\sin\phi\}\beta_{l,k} e^{i(k\xi + l\eta - \omega t)} \qquad 3.10$$

It is therefore convenient to define, $$\alpha_{k,l} = \omega \left\{ -i\cos\theta + \frac{k}{\kappa}\sin\theta\cos\phi + \frac{l}{\kappa}\sin\theta\sin\phi \right\} \beta_{k,l} \equiv p_{k,l}\beta_{k,l} \qquad 3.11$$

and, $$\delta_{k,l} = i\{l\cos\phi + k\sin\phi\}\beta_{k,l} \equiv q_{k,l}\beta_{k,l} \qquad 3.12$$

as the Fourier coefficients of radial velocity and line of sight slope. Note that as the radar continues to view a given scene over an extended period of time, $\theta$, $\phi$ and R will change continuously. For the wave dependence of the surface RCS we assume the form, $$\sigma = \sigma_0 + \frac{\partial \sigma}{\partial \zeta_r} \zeta_r + \ldots \qquad 3.13$$

Assuming only the dependencies exhibited in 3.13 and 3.5 of the scattering Doppler spectrum on the surface wave variables, the partial derivative of the negative log likelihood function with respect to the Fourier coefficient $\beta_{l,k}$ will be given by, $$\frac{\partial(-\ln \mathcal{P})}{\partial \beta_{k,l}} = \iiint f(r,x,t) \frac{\partial \mu(r,x,t)}{\partial \beta_{k,l}} \, drdxdt \qquad 3.14$$

where the function f is given by, $$f(r,x,t) = \left[ \frac{N}{\mu(r,x,t)} - \frac{I(r,x,t)}{\mu^2(r,x,t)} \right] \qquad 3.14a$$

We may expand the derivative of the expected image intensity $\mu$ into, $$\frac{\partial \mu(r,x,t)}{\partial \beta_{k,l}} = \int \left[ \frac{\delta\mu(r,x,t)\partial u_r(r,y,t)}{\delta u_r(r,y,t) \, \partial \beta_{k,l}} + \frac{\delta\mu(r,x,t)\partial \zeta_r(r,y,t)}{\delta \zeta_r(r,y,t) \, \partial \beta_{k,l}} \right] dy \qquad 3.15$$

where the quantities, $$\frac{\delta\mu(r,x,t)}{\delta u_r(r,y,t)} \text{ and } \frac{\delta\mu(r,x,t)}{\delta \zeta_r(r,y,t)}$$

denote functional derivatives of the expected image intensity $\mu(r,x,t)$ with respect to the corresponding surface variables at the identical range and imaging epoch, but can occur at arbitrarily displaced azimuth in accordance with the imaging model 3.5. Efficient and consistent evaluation of these functional derivatives is the primary numerical and computational issue in question. Since the R/V ($=\gamma$) ratio of practical radar systems can extend to well over 100, small changes in the radial velocity can induce large azimuth shifts relative to the nominal azimuth resolution of the radar. This implies that we should be wary of directly differentiating 3.5 with respect to the radial velocity $u_r$. A consistent means of performing the required evaluations can be derived from the following observations:

1) Tile (pixel averaged) radial velocity field must be a continuous function of azimuth.
2) The resultant image density as a function of azimuth does not generally vary rapidly owing to azimuthal smearing produced by unresolved radial velocity spread, i.e., the width of S(x) is typically at least several times the SAR azimuth resolution.
3) We would like to perform the outer azimuth (x) integral of 3.4 as a convolution, once $\mu(r,x,t)$ has been determined as well as in order to utilize conventional FFT algorithms as much as possible for performing the Fourier integrals.

The key to realizing these possibilities is to transform the integration variable in 3.5 into the azimuthally shifted coordinate $z = y - \gamma u_r(y)$ for each range gate. To effect this transformation we must generate the integral measure function $g(z)$ such that, $$\mu(x) = \int \sigma(y) S[x - y - \gamma u_r(y)] dy = \int S[x - z] \, g(z) dz \qquad 3.16$$

This representation requires that the normalized Doppler spectrum S depend upon the surface variables only through the radial velocity field as indicated. Tile function $g(z)$ can be constructed from 3.15 formally by noting that, given z, then for any $y_k$ such that $$v(y_k) \equiv y_k + \gamma u_r(y_k) = z \qquad 3.17$$

contributions of the form, $$\mathcal{G}_k(z) = \frac{\sigma(y_k)}{|1 + \gamma u_r(y_k)|} \qquad 3.18$$

will arise in $\mathcal{G}(z)$ in the neighborhood of each $y_k$. Thus formally we may take, $$\mathcal{G}(z) = \sum_{k=1}^{K(z)} \mathcal{G}_k(z) \qquad 3.19$$

where $K(z)$ counts the roots of 3.15 occurring at each value of displaced azimuth z. Since the signal processing must be carried out on a discrete representation of $u_r$, S, $\sigma$, etc., it is simplest to implement the y to z transformation using a polygonal (e.g., piecewise linear) approximation to these functions. This can be accomplished by analysis of FIG. 10, which shows the mapping of a single discrete interval of y across several intervals of z using the y→z mapping. We utilize a finite element approach to the accumulation of the "influence" of the intervals $[v_n, v_{n+1}]$, $[\sigma_n, \pi_{n+1}]$ of variation of the $v = y + \gamma u_r(y)$ and $\sigma(y)$ functions occurring over the interval $[y_n, y_{n+1}]$. Assuming that v and $\sigma$ vary linearly as functions of y between the discrete sample values, we take for the contribution of this interval of y to the i'th sample point of $\mathcal{G}(z)$, i.e., $g_i$ the form, $$g_{i,n} = \int_{z_{i-1}}^{z_{i+1}} \left[1 - \frac{|z - z_i|}{\Delta z}\right] \left[\sigma_n \left\{\frac{v_{n+1} - z}{v_{n+1} - v_n}\right\} + \sigma_{n+1} \left\{\frac{z - v_n}{v_{n+1} - v_n}\right\}\right] \frac{dz}{v_{n+1} - v_n} \qquad 3.20$$

where $v_n < z_i < v_{n+1}$ has been assumed. Related forms holds for the bounding index values of z just below the limiting value $v_n$, or just above $v_{n+1}$. For instance, we obtain for $\hat{g}_i$ where i is such that, $z_i < v_{n \leq i+1}$, and $z_i > z_j$ for all j such that $z_j < v_n$, the form 3.18 with the lower limit of integration replaced by $v_n$, and similarly for the upper bounding value of z. Explicit evaluations of these integrals are then readily derived for each case.

We adopt the notational convention of using script letters for measure related quantities appearing in continuous integral forms and ordinary Arabic letters for their discrete (signal processing) approximation counterparts. Tile discrete measure of the transformed integral is then given by, $$g_i(z_i; r, t) = \sum_{m=1}^{M} g_{i,m}(z_i, v_m, v_{m+1}, \sigma_m, \sigma_{m+1}; r, t) \qquad 3.21$$

where M is the number of azimuth intervals in y. Evaluation of the gradient then requires that we also obtain the operators, $$F_{i,m} = \frac{\partial g_i}{\partial v_m} \text{ and } H_{i,m} = \frac{\partial g_i}{\partial \sigma_m} \qquad 3.22$$

which are readily calculated from 3.20. The expected image intensity and its functional derivatives can then be expressed as, $$\mu(r, x, t) = \int S(x - z) \mathcal{G}(z; r, t) dz \qquad 3.23$$

$$\frac{\delta \mu(r, x, t)}{\delta u_r(r, y, t)} = \int S(x - z) \mathcal{H}(z, y; r, t) dz \qquad 3.24$$

and $$\frac{\delta \mu(x; r, t)}{\delta \zeta_r(y; r, t)} = \int S(x - z) \mathcal{S}(z, y; r, t) dz \qquad 3.25$$

where the discrete representations of 3.24 and 3.25 are obtained from the g vector and F and H matrices of 3.21 and 3.22.

In 3.24–25 we have adopted the notation that all arguments appearing after the semicolon represent dependencies (on the associated surface variables) which during computation do not require storage in the computer algorithm to be described. Evaluation of 3.4 can then be performed by substitution of 3.23 which can be evaluated by fast convolution algorithms based upon discrete Fourier transform methods. Once $\mu(r, x, t)$ has been evaluated the function $f(r, x, t)$ can be directly computed.

Insertion of 3.24 and 3.25 into 3.15 then yields, $$\frac{\partial \mu(x; r, t)}{\partial \beta_{k,l}} = \qquad 3.26$$

$$\int \int S(x - z) \left[\mathcal{H}(z, y; r, t) \frac{\partial u_r(r, y, t)}{\partial \beta_{k,l}} + \mathcal{S}(z, y; r, t) \frac{\partial \zeta_r(r, y, t)}{\partial \beta_{k,l}}\right] dz dy$$

Examination of 3.14 and 3.26 reveals that the x integral (image azimuth) can be performed via convolution also as only the shifted normalized Doppler spectrum $S(x-z)$ depends upon x in 3.26. Defining the function, $$T(z; r, t) = \int f(r, x, t) S(x - z) dx \qquad 3.27$$

we then obtain for 3.14, $$\frac{\partial(-\ln \mathcal{P})}{\partial \beta_{l,k}} = \int \int \int \int T(z; r, t) [\mathcal{H}(z, y; r, t) p_{k,l} + \mathcal{S}(z, y; r, t) q_{k,l}] dz e^{i(k\xi + l\eta - \omega t)} dt dr dy \qquad 3.28$$

where the Fourier representation of 3.6, 3.11 and 3.12 have been utilized. Since the P, F and $\mathcal{H}$ functions must be computed as functions of z, r, and y (i.e., in SAR range and azimuth coordinates), we introduce the transformation on $(r, y) \rightarrow (\xi, \eta)$, $$\xi = r\cos\phi(t) + y\sin\phi(t) \qquad 3.29a$$

and $$\eta = -r\sin\phi(t) + y\cos\phi(t) \qquad 3.29b$$

This permits the r, y integration to be performed as a Fourier transformation after expression of the z integrals as functions of $\xi$ and $\eta$ via 3.29.

4. Computational Algorithm

Reviewing the preceding we arrive at the following step by step procedure for computation of the negative log likelihood function and its gradient with respect to the surface wave Fourier coefficients.

0. Execute steps 1 through 8 for each imaging epoch t.
1. From the elevation function Fourier coefficients $\beta_{k,l}$ we construct the surface wave radial velocity and line of sight slope field for the current imaging epoch t. These variables will be most efficiently produced via a two-dimensional FFT as functions of ground reference frame coordinates $\xi$ and $\eta$ by multiplying the Fourier coefficients of the surface elevation map ($\beta_{k,l}$) by the $\sigma_{k,l}$ and $\delta_{k,l}$ (3.9 & 3.10) for the creation of $u_r$ and $\zeta_r$, respectively. Using the value of viewing azimuth $\phi(t)$ appropriate to the current t value, we then transform these into the instantaneous range and azimuth coordinates (r, y) of the radar via a 3.29. We then execute steps 2 through 8 on the resultant $u_r(r, y)$ and $\zeta_r(r, y)$ maps.

2. For each range gate (r value) perform this step and steps 3 through 6. Convert the line of sight slope function $\zeta_r(y,r;t)$ into the predicted radar cross section azimuth profile $\sigma(y;r,t)$ (e.g., via 3.13) and the radial velocity azimuth profile into the image coordinate azimuth $v(y)$ via $v(y)=y+\gamma u_r(y)$, using values of slant range appropriate for the current value (image). Similarly we must regenerate the Doppler Spectrum function(s) $S(x)$ appropriate to the current viewing parameters. These latter forms can be precomputed for the entire computation if storage permits.

3. Compute the measure transformation of the velocity bunching integral in azimuth transforming from true ground azimuth y into the velocity modulated coordinate z. This step generates the discrete counterparts of the $g(z)$, $F(z,y)$ and $\mathcal{H}(z,y)$ (i.e., the g vector and F, and H matrices H defined above). Note storage for only a single F and H array must be provided as it can be reused for each range gate and image.

4. Using the $g(z)$ function generated in step 3, perform a fast convolution with the normalized Doppler spectrum $S(x-z)$ to obtain the predicted image intensity as a function of SAR image azimuth x. From the resultant $\mu(x;r,t)$ compute the contribution to the total negative log likelihood function and the function $f(x;r,t)$ for subsequent use in evaluating the gradient.

5. Perform the correlation integration of the function $f(x;r,t)$ previously generated in step 4 with the normalized Doppler spectrum $S(x-z)$ to obtain the T function of 3.27. Again this can be performed by a fast FFT based correlation method.

6. The z integration of equation 3.28 is now performed by direct summation (inner products). This step will be reasonably fast because the F and H operators are banded, i.e., differ from 0 for a given y, over a reduced range in z on of order of the radial velocity spread induced azimuth smearing width. This process generates the function $P(y;r,t)$ of (true) azimuth y for the range gate r and image epoch t being processed.

7. After Steps 2–6 have been carried out for each range gate, the partial derivatives of the negative log likelihood function with respect to the radial velocity and line of sight slope maps at image epoch t are now available. We now utilize 3.29 to transform these functions of range r and true azimuth y into the corresponding functions of ground fixed reference system coordinates $\xi$ and $\eta$.

8. The transformed partial derivative $(\xi,\eta)$ maps are then Fourier transformed into wavenumber space (k,l) via a two dimensional FFT, i.e., the inverse of the transform used to construct $u_r$ and $\zeta_r$ and each Fourier component is multiplied by the wave number dependent phase factor $\psi(k,l,t)=e^{i\psi^{(k,l)t}}$ and multiplied by the corresponding $\beta_{k,l}$ or $\sigma_{k,l}$ to transform back into derivatives with respect to $\beta_{k,l}$. The results of this process are accumulated for each image epoch. The phases of the original Fourier coefficient array are then advanced to the next image epoch time level by componentwise multiplication of the $\beta_{k,l}$ by the conjugate of 3.30, and steps 1 through 8 repeated for each image epoch. +Pl 9. Upon completion of steps 1 through 8 for each image epoch t, we will have accumulated the total range, azimuth and time integrals of the negative log likelihood function and its gradient with respect to the Fourier coefficients of the surface wave system. +P It should be clear from the above discussion that the major contributor to the storage requirements for operation of the algorithm is the necessity of keeping the image data $I(r,x,t)$ available for evaluation of the probability functional and the $f(r,x,t)$ kernel of the gradient SAR azimuth convolution. The remaining arrays required are not more than several times the size of an array holding a single image of the total time sequence. +P One subtlety that should be taken into account is the fact the the shifted azimuth domain (z argument) width should exceed the width of the true azimuth domain illuminated by the radar beam by an amount sufficient to guarantee that all velocity modulated azimuths lying within the region processed are treated without convolutional or periodic wave Fourier representation wraparound effects. This also suggests that the SAR processing of the imagery might also include processing for nominal azimuth positions lying outside of the radar beam ground footprint, but which can exhibit contributions from Doppler velocity shifted scatterers near the beam edges. +pl 5. Use of a priori Information +P The discussion of section 2 dealt with that portion of the total likelihood function which was dependent upon the detailed structure of the radar intensity imagery. In addition we might wish to assume some prior information in order to facilitate the processing. In particular it may be feasible to deduce certain integral properties of the surface sea state from simpler manipulations of the radar measurements or one might possibly have at hand other meteorological measurements of value in performing the overall processing. The simplest example of such a priori data would be some source of approximate knowledge of the surface wind speed and/or overall sea state prevailing in the measurement area. If one has at hand a spectral description of the wave field of the form, $$F_\zeta(l,k)=F(\vec{K};\vec{U}) \qquad 3.31$$

where $\vec{U}$ is the local mean wind vector and $F_\zeta$ is the power spectral density of surface waves as a function of vector wave number $\vec{k}$, then for each Fourier component of a linear Gaussian ocean defined over a domain of $\Delta\xi$ in downwind and $\Delta\eta$ in cross wind extent, the a priori probability if the wave amplitude Fourier coefficients of section 2 can be shown to be, $$\mathcal{P}_0 = \frac{1}{\pi^N \Pi\, Q_{l,k}} \exp\left\{ -\sum_{l,k} \frac{\beta^*_{l,k}\beta_{l,k}}{Q_{l,k}} \right\} \qquad 3.32$$

where N is the total number of wave components $\beta_{l,k}$ and $Q_{l,k}$ are given by, $$Q_{l,k}=F_\zeta(l\hat{e}_\eta;\vec{U})\Delta k\Delta l \qquad 3.33$$

where $\hat{e}_\xi$ and $\hat{e}_\eta$ are unit vectors in the $(\xi,\eta)$ system, which is now assumed aligned with the wind, an $\Delta k$ and $\Delta l$ are the dimensions of a unit cell in the Fourier wavenumber space. Thus we may augment the negative log likelihood function of 3.4 with the diagonal quadratic form, $$-\ln \mathcal{P}_0 = \sum_{l,k} \frac{\beta^*_{l,k}\beta_{l,k}}{Q_{l,k}} \qquad 3.34$$

It is preferable to assume uncertainty about the level of surface wave energy in a given locale even if accurate measurements of the wind speed and direction are available. This is due to the fact that the longest surface wave components present are usually dominated by swells generated by recent storms at some distance away. These cannot be predicted on the basis of local wind speed even if a completely equilibrated spectrum of shorter wavelength waves is a reasonable expectation.

The presence of long wavelength swell can usually be established with simpler processing of the imagery than that outlined in section 2. In particular for wavelengths in excess of about 100–150 meters, the swell waves will, for most seas states, lie in a predominantly linear SAR imaging regime. Therefore, a useful prelude to the full likelihood processing would be to estimate the long wavelength swell Fourier components from a linear transfer function to obtain an initial estimate of the long wavelength part of the overall amplitude spectrum. This estimate would be utilized as a starting guess for subsequent likelihood processing as discussed in section 2.

6. Functional Minimization Approach

The most efficient general methods for nonlinear functional minimization using derivative information are variable metric techniques which involve the accumulation of an approximation to the Hessian matrix or its inverse as the minimization proceeds. These methods must be modified to conserve computer memory. For instance a minimum size simulation for the 2-D processing would involve a 300 by 300 array of pixels and therefore roughly $10^5$ Fourier surface wave components implying that the Hessian matrix would contain on the order of $10^{10}$ elements. Experience has shown that during the critical initial stages of descent, the accumulated metric information becomes outdated rather rapidly, i.e., that overall convergence is improved by periodically resetting the inverse Hessian matrix to unity. Since the updates to the inverse Hessian matrix are typically rank one or rank two depending upon the precise algorithm being used and since the number of updates performed appears to be small (5–15) before restarting becomes beneficial, it is evident that far greater storage efficiency is attained by simply storing the update vectors, and reconstructing the the rows of the current inverse Hessian upon each iteration. This can be accomplished by maintaining storage for a fixed number of vectors and replacing them in a circular queue fashion as the calculation proceeds. Optimization of this approach will require some numerical experimentation.

We claim:

1. A method for reducing clutter in synthetic aperture radar (SAR) images of the ocean surface, the method comprising the steps of:

obtaining spotlight mode SAR images of a selected patch of the ocean surface;

computing an estimate of the ocean surface parameters of the patch of the ocean surface as it was at the time that the spotlight mode SAR images were obtained; and modifying the spotlight mode SAR images, based on the ocean surface parameters, to remove distortion effects caused by movements in the ocean surface, and to produce clutter-reduced SAR images.

2. A method as defined in claim 1, wherein the step of modifying the spotlight mode SAR images includes:

computing expected SAR intensities from the estimated ocean surface parameters;

comparing the expected SAR intensities to measured SAR intensities to obtain an intensity modulation field indicative of a possible target of interest; and correcting the intensity modulation field using surface wave motion data from the estimated ocean surface parameters, to produce an undistorted intensity modulation field indicative of the possible target.

3. A method as defined in claim 1, wherein the step of computing an estimate of the ocean surface parameters includes:

making an initial guess of the ocean surface parameters based on environmental data;

computing expected SAR intensities based on the estimated ocean surface parameters, and on a radar scattering model and an acquisition system model;

comparing the expected SAR intensities with measured SAR intensities;

updating the ocean surface parameters if the comparison is not favorable; and repeating the steps of computing expected SAR intensities, and comparing with measured SAR intensities, until a favorable comparison is made in the comparing step.

4. A method as defined in claim 3, wherein the step of computing expected SAR intensities is followed by:

computing a likelihood value and a likelihood gradient associated with the measured SAR intensities and the expected SAR intensities.

5. A method as defined in claim 4, wherein the step of comparing the expected SAR intensities with measured SAR intensities is made on the basis of the likelihood value and the likelihood gradient.

6. A method as defined in claim 1, and further comprising the steps of:

comparing the clutter-reduced SAR images with a selected target signature; and estimating the probability that a target of the selected signature has been detected.

7. A method as defined in claim 6, wherein:

the selected target signature is of a surface vessel.

8. A method as defined in claim 6, wherein:

the selected target signature is of a known ocean surfactant.

9. A method as defined in claim 1, and further comprising the step of:

analyzing the clutter-reduced SAR images to produce weather and ocean current data.

10. A method as defined in claim 5, and further comprising the steps of:

comparing the clutter-reduced SAR images with a selected target signature; and estimating the probability that a target of the selected signature has been detected.

11. A method as defined in claim 10, wherein:

the selected target signature is of a surface vessel.

12. A method as defined in claim 10, wherein:

the selected target signature is of a known ocean surfactant.

13. A method as defined in claim 10, and further comprising the step of:

analyzing the clutter-reduced SAR images to produce weather and ocean current data.

14. Apparatus for reducing clutter in synthetic aperture radar (SAR) images of the ocean surface, the apparatus comprising:

a SAR system for obtaining spotlight mode SAR images of a selected patch of the ocean surface; and a clutter reduction processor, including
      an ocean model, based initially on a guessed set of ocean surface parameters,
      means for computing, based on the ocean model, an estimate of the ocean surface parameters in,the patch of the ocean surface as it was at the time that the SAR images were obtained,
      means for comparing the estimated ocean surface parameters with the actual SAR images,
      means for updating the ocean model if the comparison made by the means for comparing is not favorable, whereby .the ocean model is repeatedly updated until the comparison is favorable, and
      means for modifying the SAR images to diminish effects of clutter caused by the ocean surface.

15. Apparatus as defined in claim 14, and further comprising:

means for comparing the modified SAR images with a selected target signature image, to detect the presence and course of a selected target.

16. Apparatus as defined in claim 14, wherein:

the modified SAR images are used to monitor weather data such as sea state, wind velocity, and ocean current.

* * * * *